(12) United States Patent
Takeuchi et al.

(10) Patent No.: US 10,889,161 B2
(45) Date of Patent: Jan. 12, 2021

(54) ELECTRIC VEHICLE

(71) Applicant: HONDA MOTOR CO., LTD., Tokyo (JP)

(72) Inventors: Yoshiyuki Takeuchi, Wako (JP); Ryoma Taguchi, Tokyo (JP); Takahiro Ohmi, Tokyo (JP); Osamu Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 16/217,214

(22) Filed: Dec. 12, 2018

(65) Prior Publication Data
US 2019/0193515 A1    Jun. 27, 2019

(30) Foreign Application Priority Data

Dec. 21, 2017  (JP) .................................. 2017-245583

(51) Int. Cl.
  *B60H 1/00* (2006.01)
  *B60L 7/14* (2006.01)
  (Continued)

(52) U.S. Cl.
  CPC ..... *B60H 1/00814* (2013.01); *B60H 1/00392* (2013.01); *B60H 1/00921* (2013.01);
  (Continued)

(58) Field of Classification Search
  CPC ............ B60H 1/00814; B60H 1/00392; B60H 1/00921; B60H 1/3211; B60H 2001/3266;
  (Continued)

(56) References Cited

U.S. PATENT DOCUMENTS 9,346,337 B2 * 5/2016 Takahashi .......... B60H 1/00007
2012/0326667 A1 * 12/2012 Ito ........................ H02J 7/0068
                                                              320/109
(Continued)

FOREIGN PATENT DOCUMENTS

JP       07-156645        6/1995
JP       2006-032169      2/2006
(Continued)

OTHER PUBLICATIONS

Sekino, H, "Electric Motor Vehicle", 1994, English translation from Espacenet.com (Year: 1994).*
(Continued)

*Primary Examiner* — Yazan A Soofi
*Assistant Examiner* — Naeem Taslim Alam
(74) *Attorney, Agent, or Firm* — Amin, Turocy & Watson, LLP

(57) ABSTRACT

An electric vehicle includes an electric motor, a power storage device, a control device, and a refrigerant circuit. The refrigerant circuit includes a compressor, an outdoor heat exchanger, a first indoor heat exchanger, a first expansion valve, a second expansion valve, and a second indoor heat exchanger. The control device repeats an operation of performing the other of a first operation and a second operation after performing one thereof when a remaining capacity of a power storage device is equal to or larger than a predetermined value. In the first operation, the first expansion valve is not decompressed and the second expansion valve is decompressed. In the second operation, the first expansion valve is decompressed and the second expansion valve is not decompressed.

10 Claims, 27 Drawing Sheets

(51) Int. Cl.
*B60W 10/18* (2012.01)
*B60W 10/30* (2006.01)
*B60L 50/51* (2019.01)
*B60H 1/32* (2006.01)

(52) U.S. Cl.
CPC .............. *B60H 1/3211* (2013.01); *B60L 7/14* (2013.01); *B60L 50/51* (2019.02); *B60W 10/18* (2013.01); *B60W 10/30* (2013.01); *B60H 2001/3266* (2013.01); *B60H 2001/3285* (2013.01)

(58) Field of Classification Search
CPC ... B60H 2001/3285; B60L 50/51; B60L 7/14; B60W 10/18; B60W 10/30
See application file for complete search history.

(56) References Cited

U.S. PATENT DOCUMENTS

2015/0239474 A1* 8/2015 Nakamura ................ B60L 7/14
180/170
2015/0260442 A1* 9/2015 Ragazzi .................. F25D 21/08
62/80
2016/0264077 A1* 9/2016 Abousleiman ............ B60L 1/02
2018/0001744 A1* 1/2018 Vehr .................. B60H 1/00428

FOREIGN PATENT DOCUMENTS

| | | |
|---|---|---|
| JP | 2015-077852 | 4/2015 |
| JP | 2015-162947 | 9/2015 |
| JP | 2016-049915 | 4/2016 |
| WO | WO-9421481 A1 * | 9/1994 .............. B60L 1/003 |

OTHER PUBLICATIONS

Japanese Office Action for Japanese Patent Application No. 2017-245583 dated Apr. 16, 2019.

* cited by examiner

ELECTRIC VEHICLE

CROSS-REFERENCE TO RELATED APPLICATION

Priority is claimed on Japanese Patent Application No. 2017-245583, filed Dec. 21, 2017, the content of which is incorporated herein by reference.

BACKGROUND OF THE INVENTION

Field of the Invention

The present invention relates to an electric vehicle.

Description of Related Art

In electric vehicles, an electric motor functions as a generator at the time of braking the vehicle. That is, rotation of a drive wheel is transmitted to an output shaft of the electric motor and electric power is regenerated by the electric motor in accordance with rotation of the output shaft. A regenerated AC current is converted into a DC current by an inverter and the converted DC current is supplied from the inverter to a power storage device to be charged in the power storage device.

Among electric vehicles, an electric vehicle configured to limit a regeneration amount of the electric motor when a remaining capacity of the power storage device exceeds a predetermined value in order to protect the power storage device from overcharging is known. However, when the regeneration amount of the electric motor is limited, a regenerative braking force becomes weaker than that of a normal state and hence a passenger feels uncomfortable due to a change in brake feeling. Meanwhile, when the limitation of the regeneration amount during the braking operation is eliminated by prioritizing an effect of suppressing a change in brake feeling, a battery is deteriorated due to the overcharging.

As a countermeasure, there is disclosed a method of increasing electric power consumption of an electric load (hereinafter referred to as a vehicle air conditioner) mounted in an electric vehicle when a remaining capacity of a power storage device exceeds a predetermined value at the time of generating a regenerative braking force.

Further, there is disclosed a method of simultaneously operating a cooling device for cooling a vehicle compartment and a heating device for heating the vehicle compartment when a remaining capacity of a power storage device exceeds a predetermined value during regeneration of an electric motor (for example, see Japanese Unexamined Patent Application, First Publication No. 2015-162947 (hereinafter referred to as Patent Literature 1)).

SUMMARY OF THE INVENTION

In the vehicle air conditioner of Patent Literature 1, a cooling circuit and a heating circuit are completely separated from each other.

Meanwhile, among electric vehicles, an electric vehicle capable of cooling and heating the vehicle compartment using the vehicle air conditioner by providing a heat pump cycle in the vehicle air conditioner is known. However, in the electric vehicle, an operation of increasing the electric power consumption of the vehicle air conditioner when the remaining capacity of the power storage device exceeds a predetermined value during the regeneration of the electric motor is not disclosed.

Aspects of the present invention are contrived in view of the above-described circumstances and an object thereof is to provide an electric vehicle capable of increasing electric power consumption of a vehicle air conditioner including a heat pump cycle when a remaining capacity of a power storage device exceeds a predetermined value during regeneration of an electric motor.

In order to solve the above-described problems and achieve the object, the present invention adopts the following aspects.

(1) An electric vehicle according to an aspect of the present invention is an electric vehicle including an electric motor, a power storage device electrically connected to the electric motor, and a control device controlling the electric motor and the power storage device, including: a refrigerant circuit which includes a compressor compressing and discharging a sucked refrigerant, an outdoor heat exchanger exchanging heat between the refrigerant and external air, a first indoor heat exchanger disposed between the compressor and the outdoor heat exchanger and exchanging heat between the refrigerant and internal air, a first expansion valve disposed between the first indoor heat exchanger and the outdoor heat exchanger and capable of decompressing the refrigerant, a second expansion valve disposed between the outdoor heat exchanger and the compressor and capable of decompressing the refrigerant, and a second indoor heat exchanger disposed between the second expansion valve and the compressor and exchanging heat between the refrigerant and the internal air, wherein, when a remaining capacity of the power storage device becomes equal to or larger than a predetermined value, the control device repeats an operation of performing the other of a first operation of decompressing the second expansion valve and a second operation of decompressing the first expansion valve after performing one thereof.

Here, a method of increasing the electric power consumption of the electric vehicle in order to protect the power storage device from overcharging at the time of charging the power storage device with the electric power regenerated by the electric motor will be described below as the waste electric power control.

According to Aspect (1), when the remaining capacity of the power storage device is equal to or larger than a predetermined value during the regeneration of the electric motor, an operation of repeating the other of the first operation of decompressing the second expansion valve and the second operation of decompressing the first expansion valve after performing one thereof is performed by the waste electric power control. Thus, the electric power consumption of the air conditioner including the refrigerant circuit can be increased without influencing the environment inside the vehicle compartment. Accordingly, when the electric power consumption of the air conditioner is larger than the electric power generated by the electric motor, the overcharging of the power storage device can be prevented. Further, when the electric power consumption of the air conditioner is smaller than the electric power generated by the electric motor, an increase speed of the remaining capacity of the power storage device can be decreased.

(2) In Aspect (1), the electric vehicle may further include: a first bypass valve which is able to bypass the first expansion valve; and a second bypass valve which is able to bypass the second expansion valve, wherein, when the remaining capacity of the power storage device is equal to or larger than the predetermined value, the control device may switch the second bypass valve so as not to bypass the second expansion valve during the first operation and may switch the first bypass valve so as not to bypass the first expansion valve during the second operation.

Accordingly, when the remaining capacity of the power storage device is equal to or larger than a predetermined value during the regeneration of the electric motor, the refrigerant can be guided to the second expansion valve in the first operation and the refrigerant can be guided to the first expansion valve in the second operation by the waste electric power control.

(3) In Aspect (1) or (2), when the remaining capacity of the power storage device is equal to or larger than the predetermined value, the control device may increase a passing air volume of a first air guide member controlling a passing air volume of the first indoor heat exchanger along with the operation of the compressor.

In this way, the passing air volume of the first air guide member is increased along with the operation of the compressor at the time of alternatively repeating the first operation and the second operation by the waste electric power control. Thus, it is possible to exchange heat between the first indoor heat exchanger and the second indoor heat exchanger through the conditioned air. For example, it is possible to previously decrease the temperature of the first indoor heat exchanger increasing in temperature after switching the first operation and the second operation. Further, it is possible to previously increase the temperature of the second indoor heat exchanger decreasing in temperature after switching the first operation and the second operation. Accordingly, it is possible to ensure the execution time of the first operation or the second operation and to increase the electric power consumption of the air conditioner including the refrigerant circuit.

Thus, when the electric power consumption of the air conditioner is larger than the electric power generated by the electric motor, the overcharging of the power storage device can be prevented. Further, when the electric power consumption of the air conditioner is smaller than the electric power generated by the electric motor, an increase speed of the remaining capacity of the power storage device can be decreased.

(4) In any one of Aspects (1) to (3), the control device may perform an operation having the largest electric power consumption first among the first operation and the second operation.

In this way, when it is possible to increase the electric power consumption by performing the second operation at the time of alternatively repeating the first operation and the second operation by the waste electric power control, the second operation is performed first. Meanwhile, when it is possible to increase the electric power consumption by performing the first operation, the first operation is performed first.

Thus, the electric power consumption of the air conditioner including the refrigerant circuit can be increased. Accordingly, when the electric power consumption of the air conditioner is larger than the electric power generated by the electric motor, the overcharging of the power storage device can be prevented. Further, when the electric power consumption of the air conditioner is smaller than the electric power generated by the electric motor, an increase speed of the remaining capacity of the power storage device can be decreased.

(5) In any one of Aspects (1) to (4), the control device may switch the first operation and the second operation within a period in which the electric power consumption of each operation is a first state.

Here, in the first state until a first predetermined time elapses from the start of each operation of the first operation and the second operation, the electric power consumption per unit time is large. Then, the electric power consumption slowly decreases after the first predetermined time elapses and stabilizes after a second predetermined time elapses.

Therefore, the first operation and the second operation are switched within a period of the first state in which the electric power consumption is large in each operation by the waste electric power control. In this way, when the first operation and the second operation are switched within a period of the first state in which the electric power consumption is large before the electric power consumption is decreased and stabilized, the electric power consumption of the air conditioner including the refrigerant circuit can be increased. Accordingly, when the electric power consumption of the air conditioner is larger than the electric power generated by the electric motor, the overcharging of the power storage device can be prevented. Further, when the electric power consumption of the air conditioner is smaller than the electric power generated by the electric motor, an increase speed of the remaining capacity of the power storage device can be decreased.

(6) In any one of Aspects (1) to (5), the control device may switch the first operation and the second operation when a temperature of the first indoor heat exchanger becomes a first predetermined temperature or a temperature of the second indoor heat exchanger becomes a second predetermined temperature lower than the first predetermined temperature.

In this way, when the temperature of the first indoor heat exchanger becomes the first predetermined temperature or the temperature of the second indoor heat exchanger becomes the second predetermined temperature, the first operation and the second operation are switched. Thus, the electric power consumption of the air conditioner including the refrigerant circuit can be increased without influencing the indoor environment. Accordingly, when the electric power consumption of the air conditioner is larger than the electric power generated by the electric motor, the overcharging of the power storage device can be prevented. Further, when the electric power consumption of the air conditioner is smaller than the electric power generated by the electric motor, an increase speed of the remaining capacity of the power storage device can be decreased.

(7) In any one of Aspects (1) to (6), the control device may switch the first operation and the second operation when a user of the electric vehicle does not require an air conditioning operation.

Thus, it is possible to increase the electric power consumption amount of the air conditioner while honoring the air conditioning request of the user. Accordingly, when the electric power consumption of the air conditioner is larger than the electric power generated by the electric motor, the overcharging of the power storage device can be prevented. Further, when the electric power consumption of the air conditioner is smaller than the electric power generated by the electric motor, an increase speed of the remaining capacity of the power storage device can be decreased.

(8) In Aspect (7), the control device may decrease a volume of air guided into a vehicle compartment when the user of the electric vehicle does not require an air conditioning operation.

Thus, it is possible to sequentially perform the first operation and the second operation while preventing the conditioned air from flowing into the vehicle compartment. Accordingly, it is possible to suppress an influence on the environment inside the vehicle compartment and to ensure (maintain) the merchantability of the electric vehicle.

(9) In any one of Aspects (1) to (8), the control device may not switch the first operation and the second operation when the user of the electric vehicle requires an air conditioning operation.

Thus, when the air conditioning operation is required in the air conditioner including the refrigerant circuit, the required air conditioning state can be prioritized. Accordingly, it is possible to maintain the air conditioning operation of satisfying the request of the user and to ensure (maintain) the merchantability of the electric vehicle.

(10) In Aspect (9), if the user of the electric vehicle requires an air conditioning operation when the remaining capacity of the power storage device is equal to or larger than the predetermined value, the control device may decrease air conditioning operation efficiency while satisfying a request of the user.

Thus, it is possible to increase the electric power consumption of the air conditioner while satisfying the air conditioning state required by the user. Accordingly, when the electric power consumption of the air conditioner is larger than the electric power generated by the electric motor, the overcharging of the power storage device can be prevented. Further, when the electric power consumption of the air conditioner is smaller than the electric power generated by the electric motor, an increase speed of the remaining capacity of the power storage device can be decreased.

According to Aspects of the present invention, it is possible to increase the electric power consumption of the vehicle air conditioner including the heat pump cycle when the remaining capacity of the power storage device exceeds a predetermined value during the regeneration of the electric motor.

DETAILED DESCRIPTION OF THE INVENTION

An embodiment of the present invention will be described with reference to the drawings.

In the embodiment, a battery electric vehicle (BEV) is exemplified as an electric vehicle, but the present invention is not limited thereto. For example, other vehicles such as a hybrid vehicle (HV) and a fuel cell vehicle (FCV) may be used.

Figure 1:
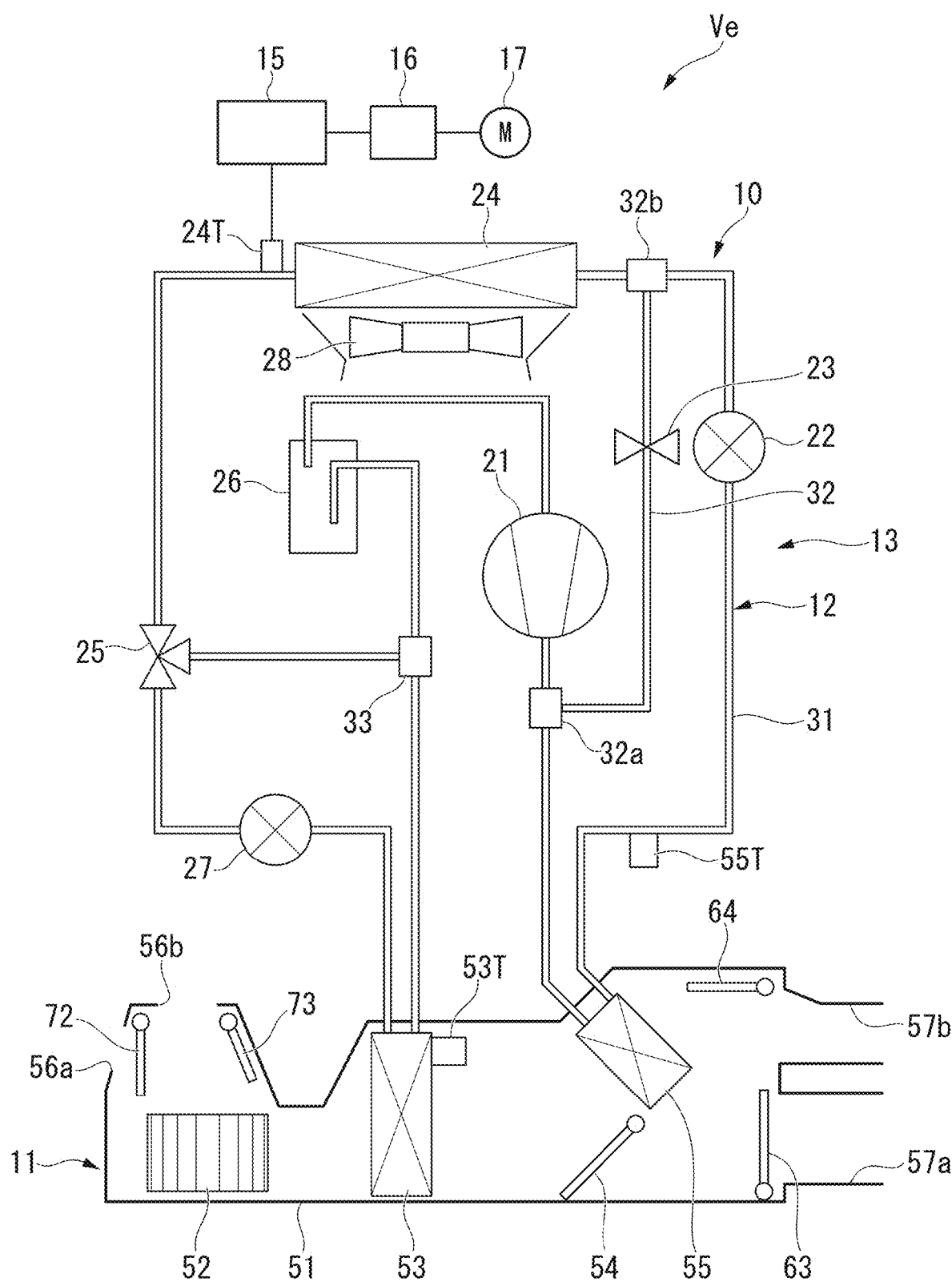
FIG. 1 is a configuration diagram of an electric vehicle including a vehicle air conditioner according to an embodiment of the present invention.

FIG. 1 is a configuration diagram of an electric vehicle Ve including a vehicle air conditioner 10.

As shown in FIG. 1, the vehicle air conditioner 10 is mounted in the electric vehicle Ve such as a battery electric vehicle which does not include an engine (an internal combustion engine) as a vehicle drive source. The electric vehicle Ve is a battery electric vehicle which includes a vehicle air conditioner 10, a control device (electronic control unit (ECU)) 15, a power storage device (a battery) 16, and an electric motor (a traveling motor) 17.

The electric motor 17 is electrically connected to the power storage device 16 through an inverter (not shown). At the time of driving of the electric motor 17, a DC current output from the power storage device 16 is converted into an AC current by the inverter and is supplied to the electric motor 17. When the AC current is supplied to the electric motor 17, the electric motor 17 generates driving power. Since the electric motor 17 generates the driving power, a drive wheel is rotationally driven in a forward movement direction or a backward movement direction.

Meanwhile, the electric motor 17 serves as a generator at the time of braking of the electric vehicle Ve. That is, the rotation of the drive wheel is transmitted to an output shaft of the electric motor 17 and electric power is regenerated by the electric motor 17 in accordance with the rotation of the output shaft. At this time, the electric motor 17 serves as a resistance and the resistance becomes a regenerative braking force to act on the electric vehicle Ve. The AC current which is regenerated by the electric motor 17 is converted into a DC current by the inverter. The converted DC current is supplied from the inverter to the power storage device 16 and is stored in the power storage device 16.

Further, the vehicle air conditioner 10 is mounted in the electric vehicle Ve. The vehicle air conditioner 10 mainly includes an air conditioning unit 11 and a heat pump cycle 12 through which a refrigerant can circulate.

The air conditioning unit 11 includes a duct 51 through which conditioned air flows, a blower 52 which is accommodated inside the duct 51, a second indoor heat exchanger (an evaporator) 53, a first air guide member (an air mix door) 54, and a first indoor heat exchanger (an indoor condenser) 55.

The duct 51 includes air inlets 56a and 56b and air outlets 57a and 57b.

The blower 52, the second indoor heat exchanger 53, the first air guide member 54, and the first indoor heat exchanger 55 are sequentially arranged from the upstream side (the side of the air inlets 56a and 56b) toward the downstream side (the side of the air outlets 57a and 57b) in the conditioned air flow direction of the duct 51.

The air inlets 56a and 56b respectively constitute an internal air inlet for taking internal air and an external air inlet for taking external air. The air inlets 56a and 56b are respectively opened or closed by an internal air door 72 and an external air door 73 and the opening degrees of the internal air door 72 and the external air door 73 are adjusted by, for example, the control of a control device 15 so that the flow rate ratio of the internal air and the external air flowing into the duct 51 is adjusted.

The air outlets 57a and 57b respectively constitute a VENT outlet and a DEF outlet. The air outlets 57a and 57b are respectively opened or closed by a VENT door 63 and a DEF door 64. When the air outlets 57a and 57b are respectively opened or closed by the VENT door 63 and the DEF door 64, for example, under the control of the control device 15, a ratio of air blowing from the air outlets 57a and 57b is adjusted.

The blower 52 is driven by a motor in response to, for example, a driving voltage applied to the motor under the control of the control device 15. The blower 52 sends the conditioned air (at least one of the internal air and the external air) taken from the air inlets 56a and 56b into the duct 51 toward the downstream side, that is, the second indoor heat exchanger 53 and the first indoor heat exchanger 55.

The second indoor heat exchanger 53 exchanges heat between a low-pressure refrigerant flowing thereinto and an atmosphere inside the vehicle compartment (inside the duct 51) and cools the conditioned air passing through the second indoor heat exchanger 53, for example, due to the absorption of heat during the evaporation of the refrigerant. The second indoor heat exchanger 53 is provided with an evaporator temperature sensor 53T which detects the temperature of the second indoor heat exchanger 53. A signal indicating the temperature of the second indoor heat exchanger 53 detected by the evaporator temperature sensor 53T is input to the control device 15. The signal input from the evaporator temperature sensor 53T to the control device 15 is used to determine whether to perform various kinds of air conditioning control in the control device 15.

The first indoor heat exchanger 55 can exchange heat with the refrigerant which flows thereinto and is compressed at a high temperature and a high pressure. The first indoor heat exchanger 55 heats the conditioned air passing through the first indoor heat exchanger 55 by, for example, the radiation of heat. Further, a second outlet temperature sensor 55T which detects the temperature of the refrigerant flowing out of the outlet of the first indoor heat exchanger 55 is provided at the downstream side of the first indoor heat exchanger 55.

A signal indicating the temperature of the refrigerant detected by the second outlet temperature sensor 55T is input to the control device 15. The signal input from the second outlet temperature sensor 55T to the control device 15 is used to determine whether to perform various kinds of air conditioning control in the control device 15.

The first air guide member 54 is rotated by, for example, the control of the control device 15. The first air guide member 54 rotates between a heating position for opening a ventilation path from the downstream of the second indoor heat exchanger 53 inside the duct 51 toward the first indoor heat exchanger 55 and a cooling position for opening a ventilation path bypassing the first indoor heat exchanger 55. Accordingly, in the conditioned air passing through the second indoor heat exchanger 53, an air volume ratio between the volume of the air introduced into the first indoor heat exchanger 55 and the volume of the air bypassing the first indoor heat exchanger 55 and discharged into the vehicle compartment is adjusted.

The heat pump cycle 12 includes, for example, a compressor 21 which compresses the refrigerant, a first expansion valve (a heating decompression valve) 22, a first bypass valve 23, an outdoor heat exchanger 24, a second bypass valve (a three-way valve) 25, a gas-liquid separator 26, and a second expansion valve (a cooling decompression valve) 27 along with the second indoor heat exchanger 53 and the first indoor heat exchanger 55 described above. The components of the heat pump cycle 12 are connected through a refrigerant passage 31. The refrigerant passage 31 is a passage through which the refrigerant can circulate.

The heat pump cycle 12, the second indoor heat exchanger 53, and the first indoor heat exchanger 55 constitute the refrigerant circuit 13. That is, the refrigerant circuit 13 is provided in the electric vehicle Ve.

The compressor 21 is connected between the gas-liquid separator 26 and the first indoor heat exchanger 55 and is operable to suck the refrigerant on the side of the gas-liquid separator 26 and to discharge the refrigerant to the first indoor heat exchanger 55. The compressor 21 is driven by a motor in response to, for example, a driving voltage applied to the motor by the control of the control device 15. The compressor 21 sucks a gas-phase refrigerant (a refrigerant gas) from the gas-liquid separator 26 and compresses the refrigerant so that the high-temperature and high-pressure refrigerant is discharged to the first indoor heat exchanger 55.

The first expansion valve 22 and the first bypass valve 23 are disposed in parallel at the downstream side of the first indoor heat exchanger 55 of the refrigerant passage 31.

The first expansion valve 22 is, for example, a throttle valve of which an opening diameter of the opening portion can be adjusted. The first expansion valve 22 decompresses and expands the refrigerant passing through the first indoor heat exchanger 55 and discharges the refrigerant to the outdoor heat exchanger 24 as a gas-liquid two-phase (a rich liquid-phase) atomized refrigerant at a low temperature and a low pressure.

The first bypass valve 23 is provided on a bypass passage 32 which connects a first branch portion 32a and a second branch portion 32b provided at both sides of the first expansion valve 22 on the refrigerant passage 31 and bypasses the first indoor heat exchanger 55 and the first expansion valve 22. The first bypass valve 23 is opened or closed by, for example, the control of the control device 15. Furthermore, the first bypass valve 23 is set to a closed state during the heating operation and is set to an open state during the cooling operation.

Accordingly, for example, when the heating operation is performed, the refrigerant discharged from the first indoor heat exchanger 55 is largely decompressed by the first expansion valve 22 and flows into the outdoor heat exchanger 24 at a low temperature and a low pressure. Meanwhile, when the cooling operation is performed, the refrigerant discharged from the first indoor heat exchanger 55 flows into the outdoor heat exchanger 24 at a high temperature through the first bypass valve 23.

The outdoor heat exchanger 24 is disposed outside the vehicle compartment and exchanges heat between the refrigerant flowing thereinto and the atmosphere outside the vehicle compartment. Further, an outlet temperature sensor 24T which detects a temperature (a refrigerant outlet temperature Tout) of the refrigerant flowing out of the outlet of the outdoor heat exchanger 24 is provided at the downstream side of the outdoor heat exchanger 24. A signal indicating the temperature of the refrigerant detected by the outlet temperature sensor 24T is input to the control device 15. The signal input from the outlet temperature sensor 24T to the control device 15 is used to determine whether to perform various kinds of air conditioning control in the control device 15.

When the heating operation is performed, the outdoor heat exchanger 24 can absorb heat from the atmosphere outside the vehicle compartment by the low-temperature and low-pressure refrigerant flowing thereinto and hence the temperature of the refrigerant is increased by the heat absorbed from the atmosphere outside the vehicle compartment. Meanwhile, when the cooling operation is performed, the outdoor heat exchanger 24 can radiate heat to the atmosphere outside the vehicle compartment by the high-temperature refrigerant flowing thereinto and hence the refrigerant is cooled by the radiation of heat to the atmosphere outside the vehicle compartment and the blowing of air of the second air guide member 28.

As the second air guide member 28, for example, a condenser fan which controls the volume of air passing through the outdoor heat exchanger 24 is exemplified, but for example, a grille shutter or the like may be used as the other examples. When the second air guide member 28 is the condenser fan, the condenser fan is driven in response to, for example, a driving voltage applied to a motor of the condenser fan under the control of the control device 15.

The second bypass valve 25 discharges the refrigerant flowing out of the outdoor heat exchanger 24 by switching the gas-liquid separator 26 or the second expansion valve 27. Specifically, the second bypass valve 25 is connected to the outdoor heat exchanger 24, a merging portion 33 disposed on the side of the gas-liquid separator 26, and the second expansion valve 27 and the refrigerant flow direction is changed by, for example, the control of the control device 15.

When the heating operation is performed, the second bypass valve 25 discharges the refrigerant flowing out of the outdoor heat exchanger 24 toward the merging portion 33 on the side of the gas-liquid separator 26. Meanwhile, when the cooling operation is performed, the second bypass valve 25 discharges the refrigerant flowing out of the outdoor heat exchanger 24 toward the second expansion valve 27.

The gas-liquid separator 26 is connected between the compressor 21 and the merging portion 33 in the refrigerant passage 31 and is operable to separate the refrigerant flowing out of the merging portion 33 into a gas phase and a liquid phase and to suck (return) the gas-phase refrigerant (the refrigerant gas) to the compressor 21.

The second expansion valve 27 is a so-called throttle valve and is connected between the second bypass valve 25 and the inlet of the second indoor heat exchanger 53. The second expansion valve 27 decompresses and expands the refrigerant flowing out of the second bypass valve 25, for example, in response to the valve opening degree controlled by the control device 15 and discharges the refrigerant to the second indoor heat exchanger 53 as a gas-liquid two-phase (a rich gas-phase) atomized refrigerant at a low temperature and a low pressure.

The second indoor heat exchanger 53 is connected between the second expansion valve 27 and the merging portion 33 (the gas-liquid separator 26).

The control device 15 performs an air conditioning control using the refrigerant in the air conditioning unit 11 and the heat pump cycle 12. The control device 15 controls the vehicle air conditioner 10 on the basis of an instruction signal input by an operator through a switch or the like (not shown) disposed inside the vehicle compartment. The control device 15 controls the electric motor 17 and the power storage device 16 and is operable to switch the operation mode of the vehicle air conditioner 10 to the heating operation mode, the cooling operation mode, or the like.

Information on SOC (State Of Charge) corresponding to a charging rate of the power storage device 16 or chargeable electric power calculated on the basis of the SOC is input to the control device 15. The chargeable electric power is electric power which is chargeable to the power storage device 16. In order to prevent overcharging of the power storage device 16, the chargeable electric power can be obtained from, for example, a table in which the chargeable electric power decreases with an increase in SOC and an upper limit value is set to 0.

Further, the control device 15 determines whether the remaining capacity of the power storage device 16 is equal to or larger than a predetermined value on the basis of the chargeable electric power. Furthermore, information on the regenerative electric power input to the power storage device 16 is input to the control device 15.

Further, the control device 15 has a function capable of controlling the electric motor 17, the vehicle air conditioner 10, the compressor 21, and the second air guide member (the fan) 28. For example, at the time of the regeneration of the heating operation mode, the control device 15 can selectively control the first expansion valve 22, the second air guide member 28, and the first air guide member 54 when the remaining capacity of the power storage device 16 is equal to or larger than the predetermined value along with the operation of the compressor 21.

Further, when a user of the electric vehicle Ve does not require the air conditioning operation of the vehicle air conditioner 10, the control device 15 can switch a first operation (to be described later) and a second operation (to be described later).

Next, the operation of the vehicle air conditioner 10 in the heating operation mode and the cooling operation mode will be described with reference to FIGS. 2 and 3. First, the heating operation mode of the vehicle air conditioner 10 will be described with reference to FIG. 2.

(Heating Operation Mode)

Figure 2:
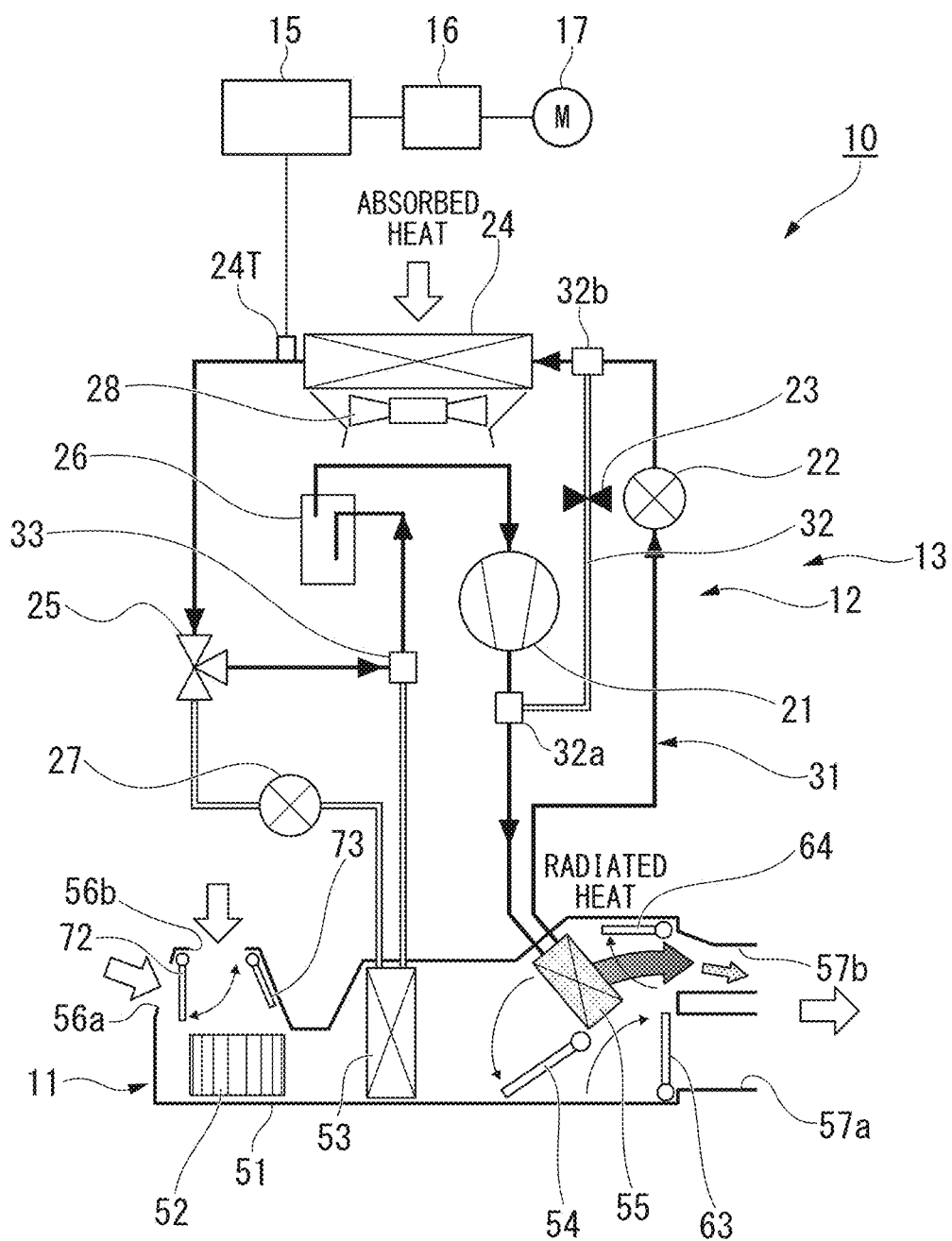
FIG. 2 is a configuration diagram illustrating a heating operation mode of the vehicle air conditioner according to the embodiment of the present invention.

As shown in FIG. 2, when the heating operation is performed by the vehicle air conditioner 10, the first air guide member 54 is set to the heating position for opening the ventilation path toward the first indoor heat exchanger 55. Further, the first bypass valve 23 is set to a closed state and the second bypass valve 25 is set to a state in which the outdoor heat exchanger 24 and the merging portion 33 are connected. Furthermore, in the example of FIG. 2, in the air conditioning unit 11, the DEF door 64 is in an open state and the VENT door 63 is a closed state. However, these opening and closing operations can be arbitrarily changed by a driver.

In this case, in the heat pump cycle 12, the refrigerant discharged from the compressor 21 at a high temperature and a high pressure heats the conditioned air inside the duct 51 of the air conditioning unit 11 by the radiation of heat in the first indoor heat exchanger 55.

The refrigerant passing through the first indoor heat exchanger 55 is expanded (decompressed) by the first expansion valve 22 to become a rich liquid-phase atomized state and exchanges heat in the outdoor heat exchanger 24 (absorbs heat from the atmosphere outside the vehicle compartment) to become a rich gas-phase atomized state. The refrigerant passing through the outdoor heat exchanger 24 flows into the gas-liquid separator 26 through the second bypass valve 25 and the merging portion 33. Then, the refrigerant flowing into the gas-liquid separator 26 is separated into a gas phase and a liquid phase and the gas-phase refrigerant is sucked to the compressor 21.

In this way, when the blower 52 of the air conditioning unit 11 is driven in a state in which the refrigerant flows through the refrigerant passage 31 of the heat pump cycle 12, the conditioned air flows through the duct 51 of the air conditioning unit 11. The conditioned air inside the duct 51 passes through the second indoor heat exchanger 53 and then passes through the first indoor heat exchanger 55.

Then, the conditioned air exchanges heat with the first indoor heat exchanger 55 when passing through the first indoor heat exchanger 55 and is supplied into the vehicle compartment for a heating purpose through the air outlet 57b.

Next, the cooling operation mode of the vehicle air conditioner 10 will be described with reference to FIG. 3.

(Cooling Operation Mode)

Figure 3:
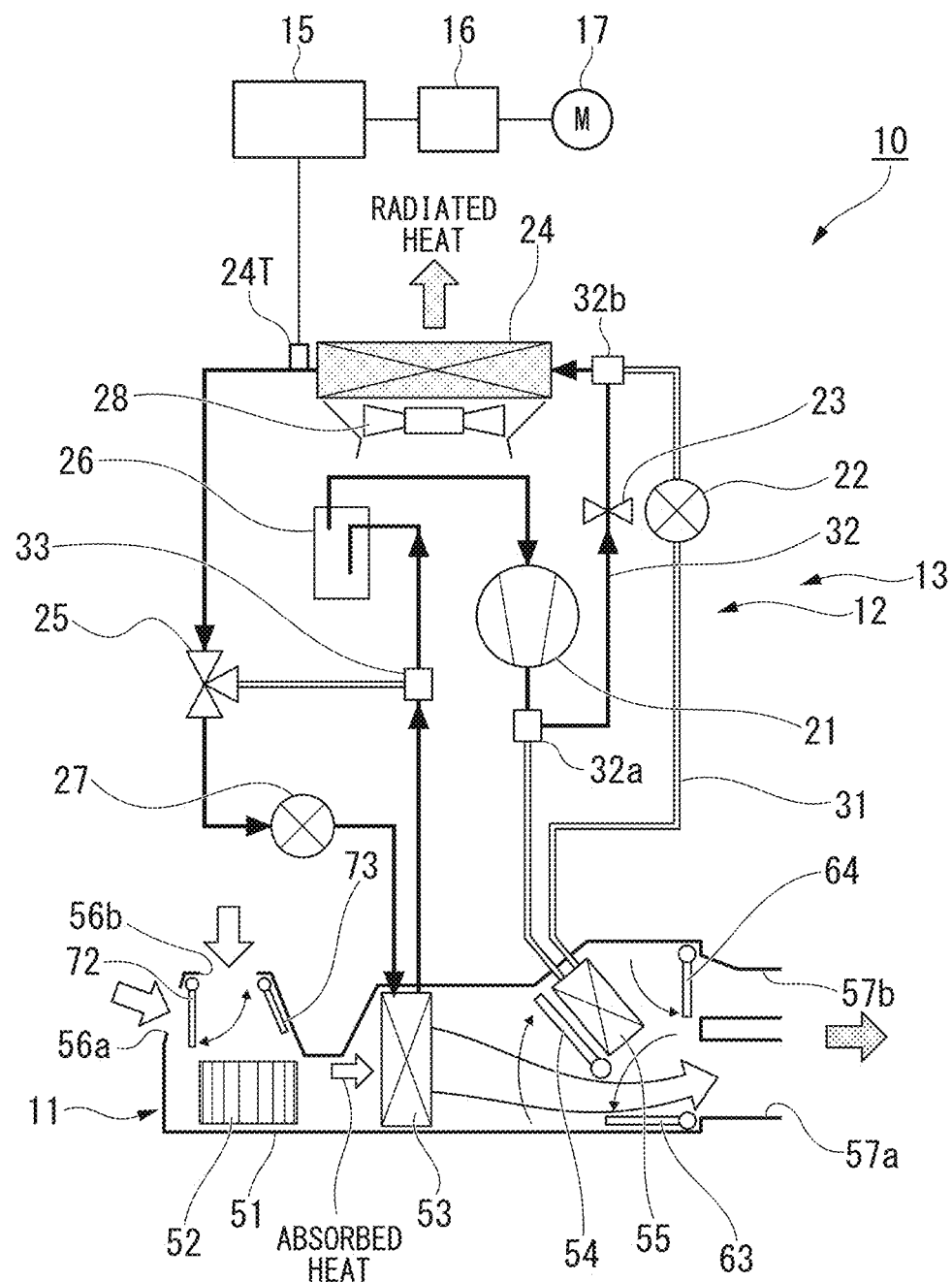
FIG. 3 is a configuration diagram illustrating a cooling operation mode of the vehicle air conditioner according to the embodiment of the present invention.

As shown in FIG. 3, when the cooling operation is performed by the vehicle air conditioner 10, the first air guide member 54 is set to the cooling position so that the conditioned air passing through the second indoor heat exchanger 53 bypasses the first indoor heat exchanger 55. Furthermore, the first bypass valve 23 is set to an open state (the first expansion valve 22 is set to a closed state) and the second bypass valve 25 is set to a state in which the outdoor heat exchanger 24 and the second expansion valve 27 are connected.

Furthermore, in the example of FIG. 3, in the air conditioning unit 11, the DEF door 64 is in a closed state and the VENT door 63 is in an open state. However, these opening and closing operations can be arbitrarily changed by a driver.

In this case, in the heat pump cycle 12, the refrigerant discharged from the compressor 21 at a high temperature and a high pressure passes through the first bypass valve 23, radiates heat to the atmosphere outside the vehicle compartment in the outdoor heat exchanger 24, and flows into the second expansion valve 27. At this time, the refrigerant is expanded by the second expansion valve 27 to become a rich liquid-phase atomized state and cools the conditioned air inside the duct 51 of the air conditioning unit 11 by absorbing heat in the second indoor heat exchanger 53.

The rich gas-phase refrigerant passing through the second indoor heat exchanger 53 flows into the gas-liquid separator 26 through the merging portion 33 and is separated into a gas phase and a liquid phase in the gas-liquid separator 26. Then, the gas-phase refrigerant is sucked into the compressor 21.

In this way, when the blower 52 of the air conditioning unit 11 is driven in a state in which the refrigerant flows through the refrigerant passage 31, the conditioned air flows through the duct 51 of the air conditioning unit 11 and exchanges heat with the second indoor heat exchanger 53 when the conditioned air passes through the second indoor heat exchanger 53. Subsequently, the conditioned air bypasses the first indoor heat exchanger 55 and is supplied into the vehicle compartment for a cooling purpose through the VENT outlet (that is, the air outlet) 57a.

Next, a first waste electric power control to a thirteenth waste electric power control which consume the electric power by the vehicle air conditioner 10 so that the remaining capacity of the power storage device 16 does not exceed a predetermined value at the time of storing the electric power regenerated by the electric motor 17 in the power storage device 16 will be described with reference to FIGS. 4 to 32.

First, the first waste electric power control which consumes the electric power by the vehicle air conditioner 10 in a state in which the cooling operation and the heating operation are not performed in the vehicle air conditioner 10 (that is, a state in which the user of the electric vehicle Ve does not require the air conditioning operation) will be described with reference to FIGS. 4 to 8.

(First Waste Electric Power Control)

The waste electric power control which is performed by the vehicle air conditioner 10 is a control which sequentially repeats an operation of performing the other of the cooling operation and the heating operation after performing one thereof.

Hereinafter, the cooling operation of the waste electric power control will be described as a "first operation" and the heating operation thereof will be described as a "second operation".

Here, the first operation and the second operation is selected in consideration of, for example, the temperature of the second indoor heat exchanger 53, the temperature of the first indoor heat exchanger 55, the external air temperature, and the like.

The temperature of the second indoor heat exchanger 53 is detected by the evaporator temperature sensor 53T. The temperature of the first indoor heat exchanger 55 is estimated by the refrigerant temperature detected by the second outlet temperature sensor 55T or the refrigerant pressure detected by the second outlet pressure sensor. In the embodiment, an example of detecting the refrigerant temperature by the second outlet temperature sensor 55T will be described.

The temperature of the outdoor heat exchanger 24 which is the external air temperature is estimated by the refrigerant temperature detected by the outlet temperature sensor 24T.

Further, a first predetermined temperature T1 is set advance as the upper limit temperature of the first indoor heat exchanger 55 at the time of performing the waste electric power control by the vehicle air conditioner 10. Furthermore, the lower limit temperature of the second indoor heat exchanger 53 is set in advance as a second predetermined temperature T2. The second predetermined temperature T2 is a temperature lower than the first predetermined temperature T1. Further, a predetermined external air temperature T3 is set in advance as the external air temperature. A predetermined indoor temperature T4 is set in advance as the indoor temperature.

Based on the first predetermined temperature T1, the second predetermined temperature T2, the predetermined external air temperature T3, and the predetermined indoor temperature T4, the first operation and the second operation are selected.

Regarding the selection of the first operation and the second operation, for example, an operation capable of largely ensuring the electric power consumption of the vehicle air conditioner 10 and ensuring the longer electric power consumption time in the waste electric power control of the vehicle air conditioner 10 is prioritized.

Specifically, for example, when the temperature of the second indoor heat exchanger 53 is higher than the second predetermined temperature T2 to a certain degree as a first determination, the first operation of cooling the second indoor heat exchanger 53 is performed first. Meanwhile, when the temperature of the second indoor heat exchanger 53 is close to the second predetermined temperature T2, the second operation of heating the first indoor heat exchanger 55 is performed first.

Further, when the temperature of the first indoor heat exchanger 55 is lower than the first predetermined temperature T1 to a certain degree as a second determination, the second operation of heating the first indoor heat exchanger 55 is performed first. Meanwhile, when the temperature of the first indoor heat exchanger 55 is close to the first predetermined temperature T1, the first operation of cooling the second indoor heat exchanger 53 is performed first.

Furthermore, for example, when the second outlet temperature sensor 55T or the second outlet pressure sensor is not provided, the first operation and the second operation can be selected on the basis of the external air temperature or the indoor temperature. For example, the first operation of cooling the second indoor heat exchanger 53 can be performed first when the external air temperature or the indoor temperature is equal to or higher than a predetermined temperature and the second operation of heating the first indoor heat exchanger 55 can be performed first when the external air temperature or the indoor temperature is lower than the predetermined temperature.

Hereinafter, an example of performing the waste electric power control by the vehicle air conditioner 10 on the basis of the first determination and the second determination will be described with reference to FIGS. 4 to 8. Here, in the waste electric power control shown in FIGS. 4 to 8, the blower 52 of the air conditioning unit 11 is maintained in a stop state so as not to be driven in a state in which the user does not require the air conditioning operation.

A "case in which the user does not require the air conditioning operation" means, for example, a "case of an air conditioning disabled state in which the user does not require the air conditioning operation" or a "case in which the volume of air or the cooling/heating load of blown air is equal to or smaller than a predetermined value in an air conditioning enabled state in accordance with the air conditioning request of the user".

First, an example of performing the first waste electric power control by the vehicle air conditioner 10 from the first operation will be described with reference to FIGS. 4 to 7.

Figure 4:
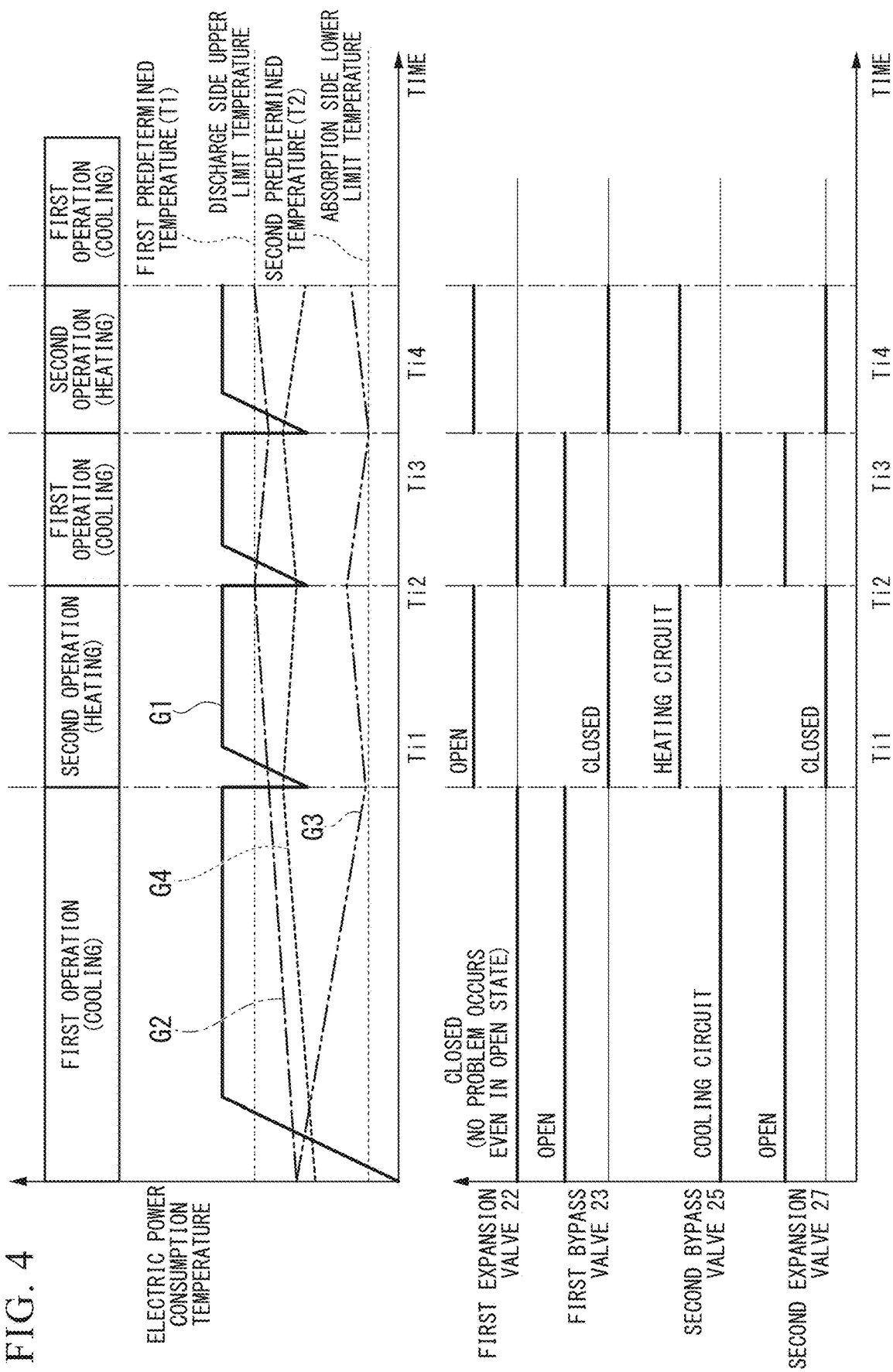
FIG. 4 is a timing chart illustrating an example in which a second operation is performed after a first operation in first waste electric power control of the vehicle air conditioner according to the embodiment of the present invention.

FIG. 4 is a timing chart illustrating an example of performing the second operation after the first operation in the first waste electric power control which is performed by the vehicle air conditioner 10. In FIG. 4, a vertical axis indicates the electric power consumption of the vehicle air conditioner 10 and the temperature of the first indoor heat exchanger 55 or the second indoor heat exchanger 53. Further, a horizontal axis indicates the elapse time of the first waste electric power control of the vehicle air conditioner 10.

The electric power consumption of the vehicle air conditioner 10 is indicated by Graph G1. Further, the temperature of the first indoor heat exchanger 55 and the temperature of the second indoor heat exchanger 53 are indicated by Graphs G2 and G3. Furthermore, the temperature of the outdoor heat exchanger 24 is indicated by Graph G4.

Figure 5:
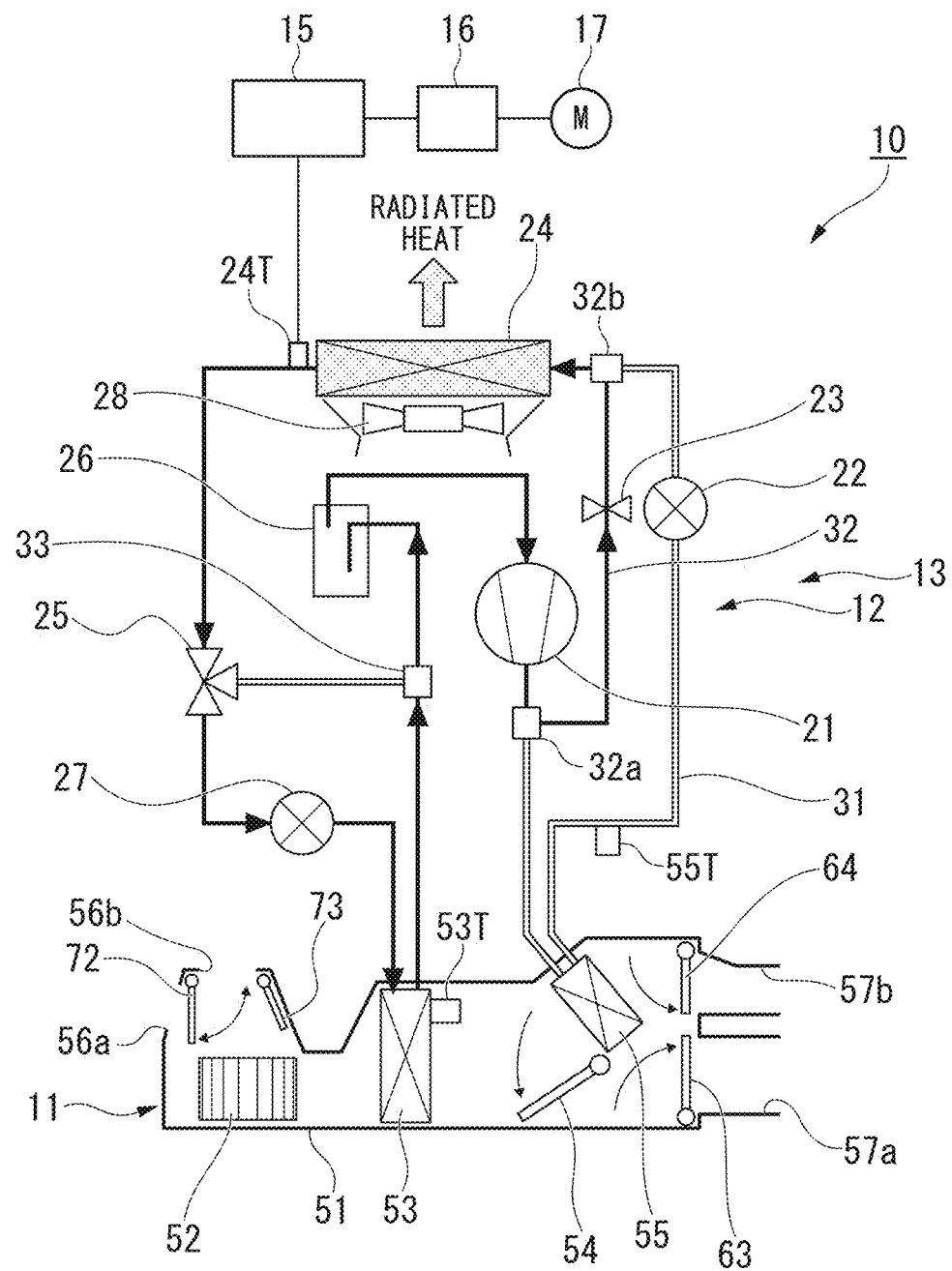
FIG. 5 is a configuration diagram illustrating a cooling operation state in the first waste electric power control of the vehicle air conditioner according to the embodiment of the present invention.

As shown in FIGS. 4 and 5, when the temperature of the second indoor heat exchanger 53 is higher than the second predetermined temperature T2 to a certain degree, the first waste electric power control which is performed by the vehicle air conditioner 10 is performed from the first operation of cooling the second indoor heat exchanger 53.

That is, the first expansion valve 22 is set to a closed state and the first bypass valve 23 is set to an open state (that is, a state of bypassing the first expansion valve 22). Further, the second bypass valve 25 is switched to a cooling circuit (that is, a circuit bypassing the second expansion valve 27) so that the second expansion valve 27 is in an open state. Accordingly, the refrigerant can be guided to the second expansion valve 27 during the first operation.

Furthermore, the first air guide member 54 is switched to the heating position to open the ventilation path toward the first indoor heat exchanger 55.

Further, in a state in which the user does not require the air conditioning operation, the VENT outlet 57a is closed by the VENT door 63 and the DEF outlet 57b is closed by the DEF door 64.

In this state, the compressor 21 is operated (driven) to perform the first operation. The refrigerant discharged from the compressor 21 at a high temperature and a high pressure bypasses the first indoor heat exchanger 55 or the first expansion valve 22 and flows into the first bypass valve 23. The refrigerant flowing into the first bypass valve 23 passes through the first bypass valve 23, radiates heat to the atmosphere outside the vehicle compartment in the outdoor heat exchanger 24, and flows into the second expansion valve 27 through the second bypass valve 25. At this time, the refrigerant is expanded by the second expansion valve 27 to become a rich liquid-phase atomized state and flows into the second indoor heat exchanger 53. That is, the cooled refrigerant flows into the second indoor heat exchanger 53.

The rich gas-phase refrigerant passing through the second indoor heat exchanger 53 flows into the gas-liquid separator 26 through the merging portion 33 and is separated into a gas phase and a liquid phase in the gas-liquid separator 26. Then, the gas-phase refrigerant is sucked into the compressor 21.

In this way, when the first operation is performed by driving the compressor 21, the electric power is consumed by the vehicle air conditioner 10 at a time Ti1 as indicated by Graph G1.

Further, the low-temperature refrigerant which flows into the second indoor heat exchanger 53 cools the conditioned air inside the duct 51 by absorbing heat in the second indoor heat exchanger 53.

Here, the blower 52 is maintained in a stop state. Further, the VENT outlet 57a is closed by the VENT door 63 and the DEF outlet 57b is closed by the DEF door 64.

Thus, the volume of the conditioned air cooled inside the duct 51 into the vehicle compartment can be suppressed to be reduced.

As the predetermined time Ti1 elapses after the first operation is performed, the second indoor heat exchanger 53 is cooled by the refrigerant and the temperature of the second indoor heat exchanger 53 decreases to the second predetermined temperature T2 as indicated by Graph G3.

Figure 6:
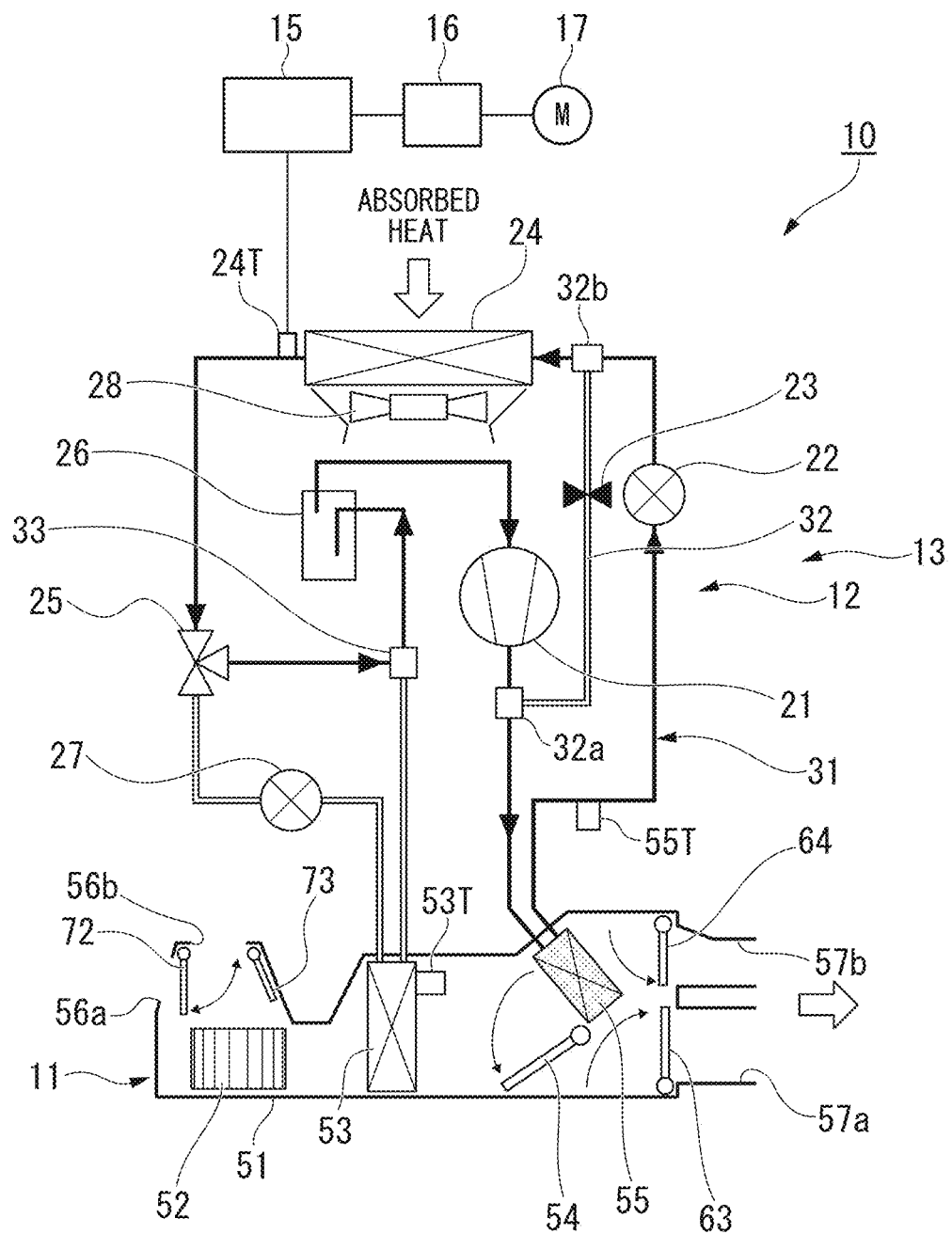
FIG. 6 is a configuration diagram illustrating a heating operation state in the first waste electric power control of the vehicle air conditioner according to the embodiment of the present invention.

In this state, the first operation is switched to the second operation (see FIG. 6). That is, as shown in FIGS. 4 and 6, the first expansion valve 22 is set to an open state and the first bypass valve 23 is set to a closed state (that is, a state not bypassing the first expansion valve 22). Further, the second bypass valve 25 is switched to a heating circuit (that is, a circuit bypassing the second expansion valve 27) so that the second expansion valve 27 is in a closed state. Accordingly, the refrigerant can be guided to the first expansion valve 22 during the second operation.

Thus, the refrigerant discharged from the compressor 21 at a high temperature and a high pressure flows into the first indoor heat exchanger 55.

The refrigerant passing through the first indoor heat exchanger 55 is expanded (decompressed) by the first expansion valve 22 to become a rich liquid-phase atomized state and exchanges heat in the outdoor heat exchanger 24 (absorbs heat from the atmosphere outside the vehicle compartment) to become a rich gas-phase atomized state. The refrigerant passing through the outdoor heat exchanger 24 flows into the gas-liquid separator 26 through the second bypass valve 25 and the merging portion 33. Then, the refrigerant flowing into the gas-liquid separator 26 is separated into a gas phase and a liquid phase and the gas-phase refrigerant is sucked to the compressor 21.

In this way, when the second operation is performed by driving the compressor 21, the electric power is consumed by the vehicle air conditioner 10 at a time (Ti2−Ti1) as indicated by Graph G1.

Further, the refrigerant flowing into the first indoor heat exchanger 55 at a high temperature and a high pressure heats the conditioned air inside the duct 51 by radiating heat in the first indoor heat exchanger 55. Here, the blower 52 is maintained in a stop state and the VENT outlet 57a and the DEF outlet 57b are closed. Thus, the volume of the conditioned air inside the duct 51 into the vehicle compartment can be suppressed to be reduced.

Further, it is possible to increase the temperature of the conditioned air cooled by the first operation by heating the conditioned air while radiating heat in the first indoor heat exchanger 55. Thus, the temperature of the conditioned air inside the duct 51 can approach the predetermined indoor temperature T4 of the vehicle compartment.

When a predetermined time(Ti2−Ti1) elapses after the second operation is performed, the first indoor heat exchanger 55 is heated by the refrigerant and the temperature of the first indoor heat exchanger 55 increases to the first predetermined temperature T1 as indicated by Graph G2.

Further, the conditioned air inside the duct 51 is heated so that the second indoor heat exchanger 53 is heated by the heated conditioned air. Thus, the temperature of the second indoor heat exchanger 53 becomes higher than the second predetermined temperature T2.

In this state, the second operation is switched to the first operation (see FIG. 5). The first operation is repeatedly performed at a predetermined time (Ti3−Ti2). In this way, when the first operation is performed by driving the compressor 21, the electric power is consumed by the vehicle air conditioner 10 at a time (Ti3−Ti2) as indicated by Graph G1.

Similarly, it is possible to consume the electric power by the vehicle air conditioner 10 by sequentially repeating the first operation and the second operation. Further, it is possible to allow the conditioned air inside the duct 51 to approach the temperature of the vehicle compartment by sequentially repeating the first operation and the second operation.

That is, according to the electric vehicle Ve, the first operation of decompressing the refrigerant by the second expansion valve 27 and the second operation of decompressing the refrigerant by the first expansion valve 22 are sequentially repeated by the waste electric power control when the remaining capacity of the power storage device 16 is equal to or larger than a predetermined value during the regeneration of the electric motor 17.

Thus, since the temperature of the conditioned air inside the duct 51 can approach the temperature of the vehicle compartment, an influence on the environment inside the vehicle compartment can be suppressed. That is, the electric power consumption of the vehicle air conditioner 10 can be increased without influencing the environment inside the vehicle compartment. Accordingly, when the electric power consumption of the vehicle air conditioner 10 is larger than the electric power generated by the electric motor 17, the overcharging of the power storage device 16 can be prevented. Further, when the electric power consumption of the vehicle air conditioner 10 is smaller than the electric power generated by the electric motor 17, an increase speed of the remaining capacity of the power storage device 16 can be decreased.

Further, in the waste electric power control in a state in which the air conditioning operation is not required, the blower 52 is maintained in a stop state and the VENT outlet 57a and the DEF outlet 57b are closed. Thus, the volume of the conditioned air heated inside the duct 51 to be guided into the vehicle compartment can be suppressed to be reduced. That is, it is possible to sequentially perform the first operation and the second operation while preventing the conditioned air from flowing into the vehicle compartment. Accordingly, it is possible to further satisfactorily suppress an influence on the environment inside the vehicle compartment and to ensure (maintain) the merchantability of the electric vehicle Ve.

Furthermore, the first air guide member 54 is switched to the heating position for opening the ventilation path. Thus, it is possible to increase the passing air volume of the first air guide member 54 when alternatively repeating the first operation and the second operation. Thus, it is possible to exchange heat through the conditioned air between the first indoor heat exchanger 55 and the second indoor heat exchanger 53. That is, it is possible to previously decrease the temperature of the first indoor heat exchanger 55 which increases in temperature after the first operation is switched to the second operation. Further, it is possible to previously increase the temperature of the second indoor heat exchanger 53 which decreases in temperature after the second operation is switched to the first operation. Accordingly, it is possible to ensure the execution time of the first operation or the second operation and to increase the electric power consumption of the vehicle air conditioner 10.

Further, when the temperature of the second indoor heat exchanger 53 is higher than the second predetermined temperature T2 to a certain degree, the waste electric power control is performed from the first operation of cooling the second indoor heat exchanger 53. Thus, it is possible to ensure a large amount of the electric power consumption of the vehicle air conditioner 10.

In this way, the first operation capable of ensuring a large amount of the electric power consumption of the vehicle air conditioner 10 is performed first when alternatively repeating the first operation and the second operation. Accordingly, the electric power consumption of the vehicle air conditioner 10 can be increased.

Furthermore, the waste electric power control for switching the first operation and the second operation is performed in a state in which the cooling operation and the heating operation of the vehicle air conditioner 10 are not performed (that is, a state in which the user of the electric vehicle Ve does not require the air conditioning operation). Thus, it is possible to increase the electric power consumption of the vehicle air conditioner 10 while honoring the air conditioning request of the user.

Figure 7:
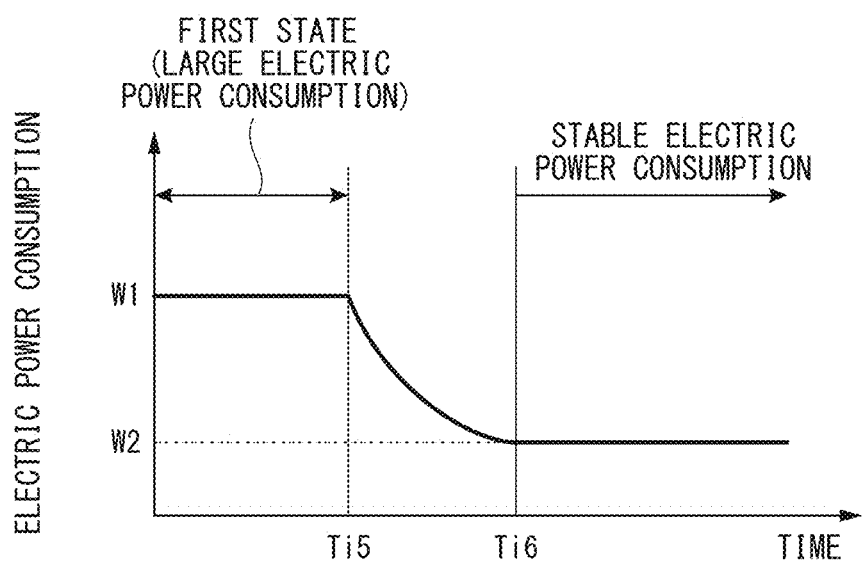
FIG. 7 is a graph illustrating a state in which the first operation and the second operation in the first waste electric power control of the vehicle air conditioner according to the embodiment of the present invention are switched.

FIG. 7 is a graph illustrating a state in which the first operation and the second operation are switched within a period of a first state in which the electric power consumption amount is large. In FIG. 7, a vertical axis indicates the electric power consumption and a horizontal axis indicates the elapse time of the first operation or the second operation.

As shown in FIG. 7, an electric power consumption amount W1 per unit time is large in the first state until a first predetermined time Ti5 elapses from the start of each operation at the time of performing the first operation or the second operation. Further, in the first operation and the second operation, the electric power consumption slowly decreases after the first predetermined time Ti5 elapses and the electric power consumption is stabilized at an electric power consumption W2 after a second predetermined time Ti6 elapses.

Therefore, the first operation and the second operation are switched by the first waste electric power control within a period of the first state in which the electric power consumption amount is large in each operation. In this way, it is possible to further increase the electric power consumption of the vehicle air conditioner 10 by switching the first operation and the second operation within a period of the first state in which the electric power consumption is large before the electric power consumption is decreased and stabilized.

(Second Waste Electric Power Control)

Next, the second waste electric power control which performs the waste electric power control of the vehicle air conditioner 10 from the second operation will be described with reference to FIGS. 5, 6, and 8. That is, when the temperature of the second indoor heat exchanger 53 is close to the second predetermined temperature T2, the second operation of heating the first indoor heat exchanger 55 is performed first.

Figure 8:
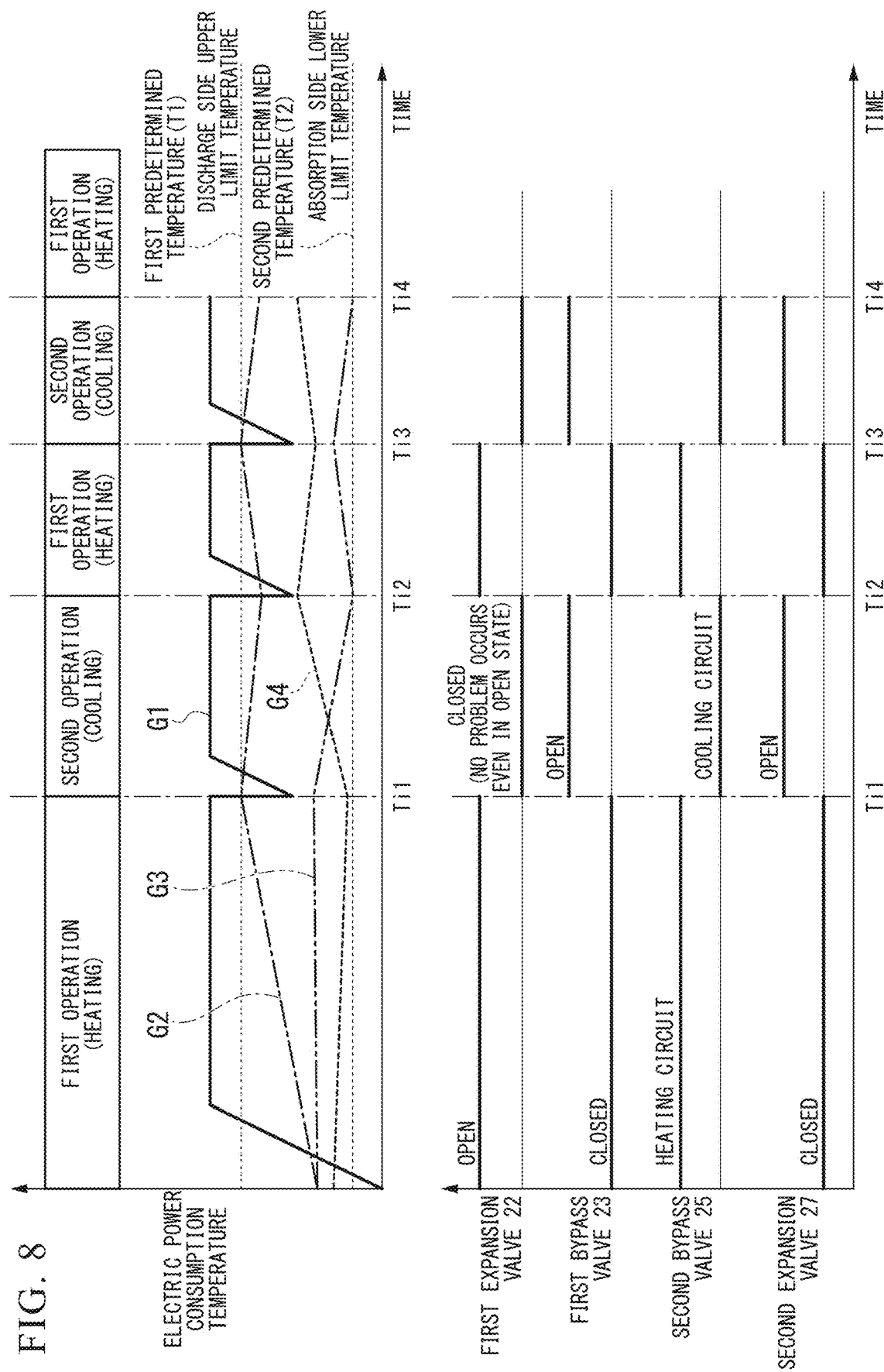
FIG. 8 is a timing chart illustrating an example in which a first operation is performed after a second operation in second waste electric power control of the vehicle air conditioner according to the embodiment of the present invention.

FIG. 8 is a timing chart illustrating an example in which the first operation is performed after the second operation in the second waste electric power control of the vehicle air conditioner 10. In FIG. 8, a vertical axis indicates the electric power consumption of the vehicle air conditioner 10 and the temperature of the first indoor heat exchanger 55 or the second indoor heat exchanger 53. Further, a horizontal axis indicates the elapse time of the second waste electric power control of the vehicle air conditioner 10.

The electric power consumption of the vehicle air conditioner 10 is indicated by Graph G1. Further, the temperature of the first indoor heat exchanger 55 and the temperature of the second indoor heat exchanger 53 are respectively indicated by Graphs G2 and G3. Furthermore, the temperature of the outdoor heat exchanger 24 is indicated by Graph G4.

Also in a case in which the second waste electric power control of the vehicle air conditioner 10 is performed from the second operation, it is possible to obtain the same effect as that of a case in which the waste electric power control is performed from the first operation.

That is, the electric power consumption of the vehicle air conditioner 10 can be increased. Accordingly, when the electric power consumption of the vehicle air conditioner 10 is larger than the electric power generated by the electric motor 17, the overcharging of the power storage device 16 can be prevented. Further, when the electric power consumption of the vehicle air conditioner 10 is smaller than the electric power generated by the electric motor 17, an increase speed of the remaining capacity of the power storage device 16 can be decreased.

Further, it is possible to satisfactorily suppress an influence on the environment inside the vehicle compartment and to ensure (maintain) the merchantability of the electric vehicle Ve.

Furthermore, when the temperature of the second indoor heat exchanger 53 is close to the second predetermined temperature T2, the second waste electric power control is performed from the second operation of heating the first indoor heat exchanger 55. Thus, it is possible to ensure a large amount of the electric power consumption of the vehicle air conditioner 10.

In this way, the second operation capable of ensuring a large amount of the electric power consumption of the vehicle air conditioner 10 is performed at the time of alternatively repeating the first operation and the second operation. Accordingly, the electric power consumption of the vehicle air conditioner 10 can be increased.

Further, the waste electric power control for switching the second operation and the first operation is performed in a state in which the cooling operation and the heating operation of the vehicle air conditioner 10 are not performed (that is, a state in which the user of the electric vehicle Ve does not require the air conditioning operation). Thus, it is possible to increase the electric power consumption of the vehicle air conditioner 10 while honoring the air conditioning request of the user.

Here, the waste electric power control for switching the first operation and the second operation is not performed in a state in which the cooling operation and the heating operation of the vehicle air conditioner 10 are performed (that is, a state in which the user of the electric vehicle Ve requires the air conditioning operation).

A "case in which the user requires the air conditioning operation" means a "case in which the volume of air or the cooling/heating load of blown air needs to be equal to or larger than a predetermined value in an air conditioning enabled state in accordance with the air conditioning request of the user".

In this way, in a state in which the user requires the air conditioning operation, the air conditioning state can be prioritized by not performing the waste electric power control for switching the first operation and the second operation. Accordingly, it is possible to maintain the air conditioning operation which satisfies the request of the user and to ensure (maintain) the merchantability of the electric vehicle.

Next, the third waste electric power control to the thirteenth waste electric power control which increase the electric power consumption of the vehicle air conditioner 10 in a state in which the cooling operation and the heating operation of the vehicle air conditioner 10 are performed (that is, a state in which the user of the electric vehicle Ve requires the air conditioning operation) will be described.

When the user of the electric vehicle Ve requires the air conditioning operation, the operation efficiency of the vehicle air conditioner 10 is decreased while satisfying the request of the user. Thus, the electric power consumption of the vehicle air conditioner 10 can be increased.

Hereinafter, a detailed example of decreasing the operation efficiency of the vehicle air conditioner 10 will be described with reference to FIGS. 9 to 32.

First, an example of performing the waste electric power control by the vehicle air conditioner 10 so that the remaining capacity of the power storage device 16 does not exceed a predetermined value at the time of storing the regenerative electric power in the power storage device 16 in the heating operation mode of the vehicle air conditioner 10 will be described with reference to FIGS. 9 to 24. As the waste electric power control of the vehicle air conditioner 10 in the heating operation mode, the first to sixth waste electric power control can be exemplified. Hereinafter, the third to thirteenth waste electric power control will be sequentially described.

First, an example of increasing the electric power consumption of the vehicle air conditioner 10 by controlling the compressor 21 and the second air guide member 28 of the vehicle air conditioner 10 will be described with reference to FIGS. 9 to 11 as the third waste electric power control.

(Third Waste Electric Power Control)

Figure 10:
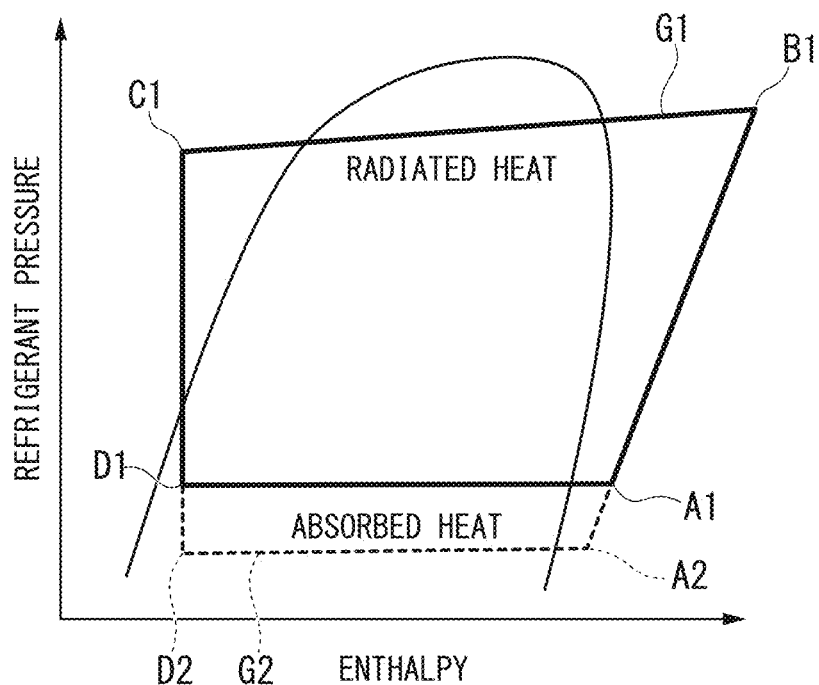
FIG. 10 is a graph showing a refrigerant pressure-enthalpy line diagram of the third waste electric power control of the electric vehicle according to the embodiment of the present invention.

FIG. 10 shows a refrigerant pressure-enthalpy line diagram, a vertical axis indicates a refrigerant pressure, and a horizontal axis indicates enthalpy. In FIG. 10, a refrigerant pressure-enthalpy line diagram G1 before the waste electric power control in the heating operation mode is indicated by a solid line. In the refrigerant pressure-enthalpy line diagram G1, Point A1→Point B1 indicates the refrigerant state change of the compressor 21. Point B1→Point C1 indicates the refrigerant state change of the first indoor heat exchanger 55. Point C1→Point D1 indicates the refrigerant state change of the first expansion valve 22.

Point D1→Point A1 indicates the refrigerant state change of the outdoor heat exchanger 24.

Further, a refrigerant pressure-enthalpy line diagram G2 after the waste electric power control is indicated by a dashed line. In the refrigerant pressure-enthalpy line diagram G2, Point A2→Point B1 indicates the refrigerant state change of the compressor 21. Point B1→Point C1 indicates the refrigerant state change of the first indoor heat exchanger 55. Point C1→Point D2 indicates the refrigerant state change of the first expansion valve 22. Point D2→Point A2 indicates the refrigerant state change of the outdoor heat exchanger 24.

Figure 11:
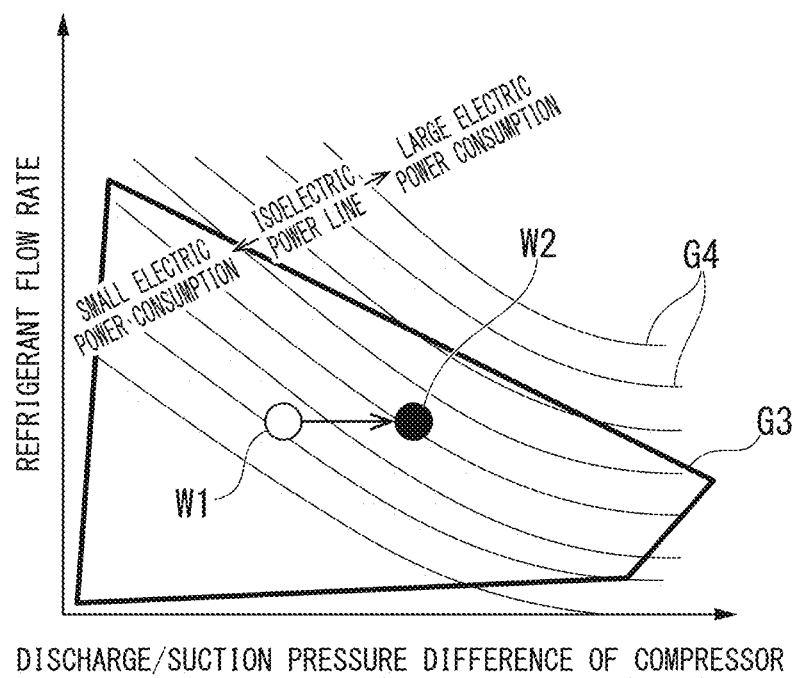
FIG. 11 is a graph illustrating electric power consumption of the third waste electric power control of the electric vehicle according to the embodiment of the present invention.

FIG. 11 shows a relationship between the heating operation range and the isoelectric power line of the vehicle air conditioner 10, a vertical axis indicates a refrigerant flow rate, and a horizontal axis indicates a discharge/suction pressure difference of the compressor. In FIG. 11, the heating operation range of the vehicle air conditioner 10 is indicated by Graph G3 and the isoelectric power line is indicated by Graph G4. Further, W1 indicates the electric power consumption of the vehicle air conditioner 10 before the waste electric power control. W2 indicates the electric power consumption of the vehicle air conditioner 10 after the waste electric power control.

Figure 9:
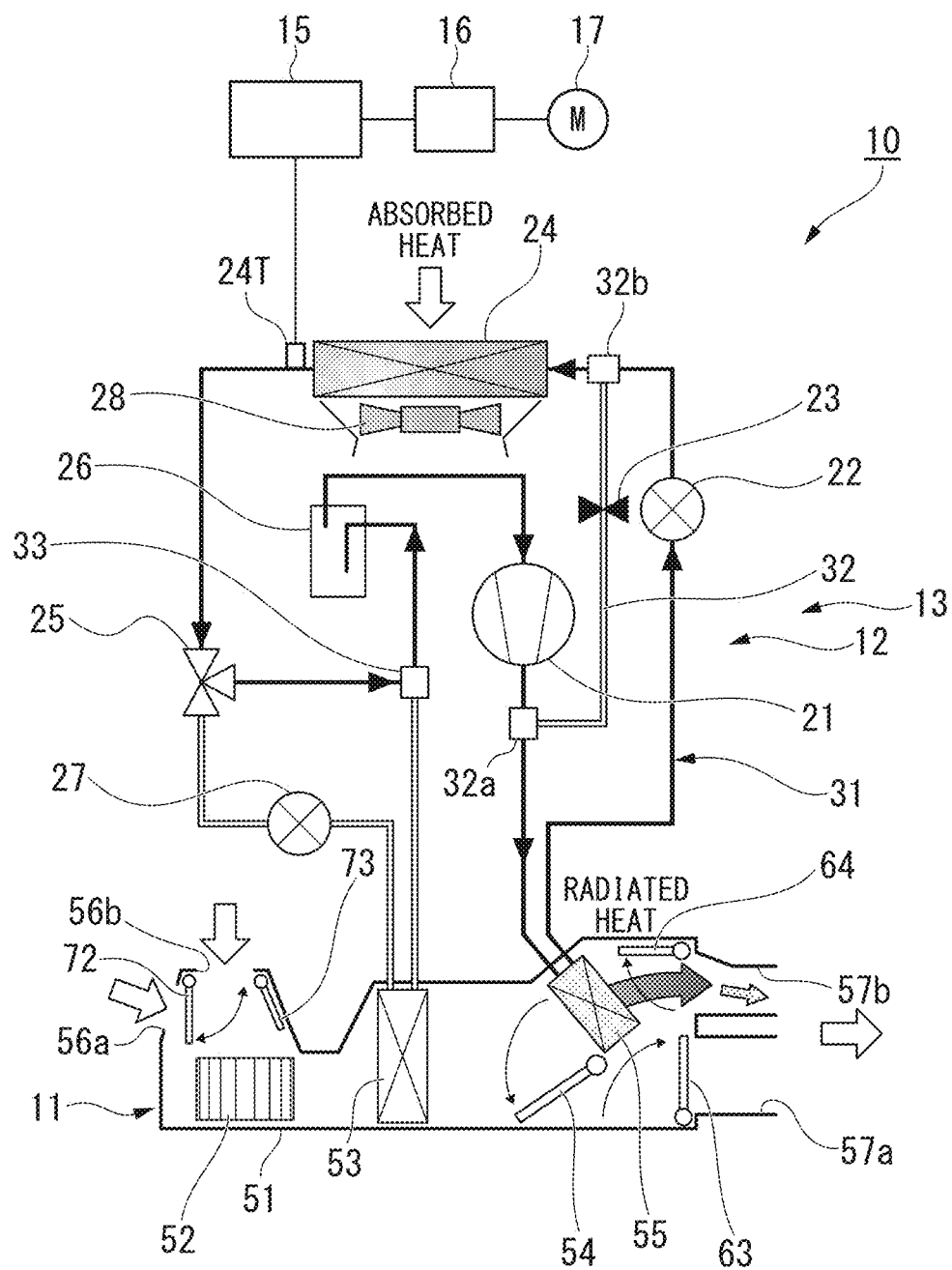
FIG. 9 is a configuration diagram illustrating third waste electric power control of the electric vehicle according to the embodiment of the present invention.

As shown in FIG. 9, when the remaining capacity of the power storage device 16 is equal to or larger than a predetermined value, the control device 15 controls the second air guide member 28 so that the passing air volume of the second air guide member 28 decreases as compared with a case in which the remaining capacity of the power storage device 16 is smaller than the predetermined value.

That is, when the second air guide member 28 is a condenser fan, the rotation speed of the fan is decreased or stopped to decrease the passing air volume of the second air guide member 28. Further, when the second air guide member 28 is a grille shutter, a gap of the grille shutter is narrowed or the grille shutter is closed to decrease the passing air volume of the second air guide member 28.

When the passing air volume of the second air guide member 28 decreases, the passing air volume of the outdoor heat exchanger 24 decreases. For this reason, the heat absorption amount due to the refrigerant flowing into the outdoor heat exchanger 24 decreases. Thus, a rich liquid-phase refrigerant passes through the gas-liquid separator 26 from the outdoor heat exchanger 24 and a gas-phase refrigerant is sucked to the compressor 21.

Thus, as shown in FIGS. 9 and 10, the suction refrigerant pressure of the compressor 21 decreases as compared with a case before the waste electric power control. Then, in order to obtain the same heating capacity as that of a case before the waste electric power control, the suction refrigerant density decreases and the refrigerant flow rate decreases. That is, when the passing air volume of the outdoor heat exchanger is decreased, the heating operation efficiency can be decreased.

In this state, it is necessary to increase the refrigerant flow rate by increasing the rotation speed of the compressor 21 in order to obtain the heating capacity before the waste electric power control. Since the rotation speed of the compressor 21 increases, the electric power consumption of the compressor 21 increases from W1 to W2 so that the waste electric power amount of the vehicle air conditioner 10 can be ensured as shown in FIGS. 9 and 11.

Accordingly, in the third waste electric power control, when the electric power consumption W2 of the compressor 21 is larger than the electric power generated by the electric motor 17, the overcharging of the power storage device 16 can be prevented. Further, when the electric power consumption W2 of the compressor 21 is smaller than the electric power generated by the electric motor 17, an increase speed of the remaining capacity of the power storage device 16 can be decreased.

Next, an example of increasing the electric power consumption of the vehicle air conditioner 10 by controlling the compressor 21 and the first air guide member 54 of the vehicle air conditioner 10 will be described with reference to FIGS. 12 to 14 as the fourth waste electric power control.

(Fourth Waste Electric Power Control)

Figure 13:
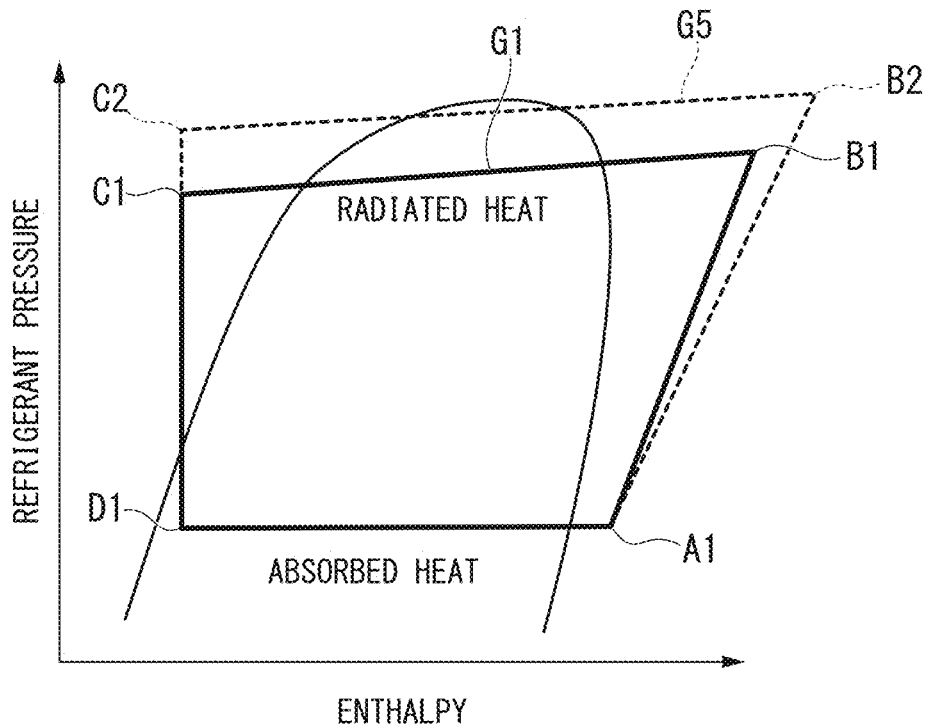
FIG. 13 is a graph showing a refrigerant pressure-enthalpy line diagram of the fourth waste electric power control of the electric vehicle according to the embodiment of the present invention.

FIG. 13 shows a refrigerant pressure-enthalpy line diagram, a vertical axis indicates a refrigerant pressure, and a horizontal axis indicates enthalpy. In FIG. 13, the refrigerant pressure-enthalpy line diagram G1 before the waste electric power control in the heating operation mode is indicated by a solid line. The refrigerant pressure-enthalpy line diagram G1 before the waste electric power control is the same line diagram as that of FIG. 10 of the third waste electric power control.

Further, a refrigerant pressure-enthalpy line diagram G5 after the waste electric power control is indicated by a dashed line. In the refrigerant pressure-enthalpy line diagram G5, Point A1→Point B2 indicates the refrigerant state change of the compressor 21. Point B2→Point C2 indicates the refrigerant state change of the first indoor heat exchanger 55. Point C2→Point D1 indicates the refrigerant state change of the first expansion valve 22. Point D1→Point A1 indicates the refrigerant state change of the outdoor heat exchanger 24.

Figure 14:
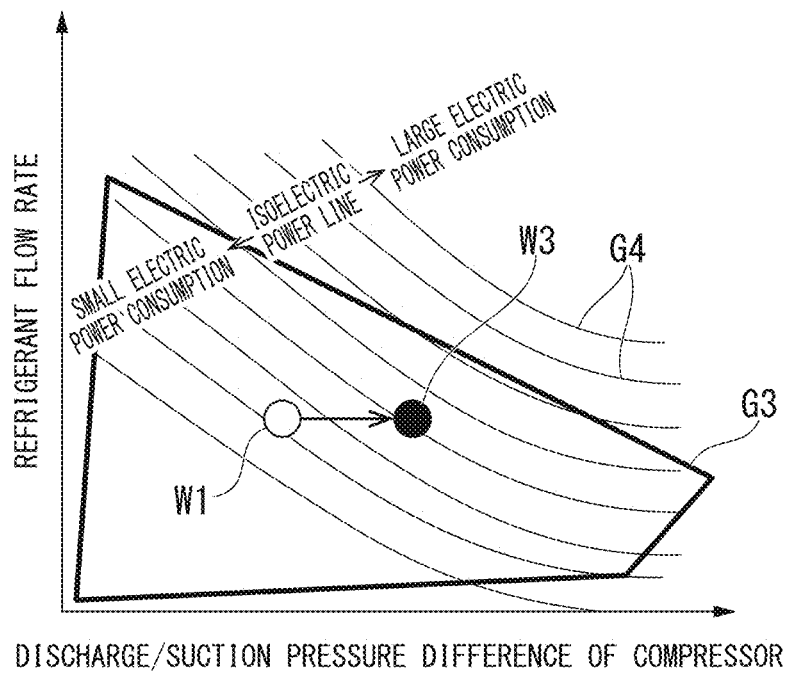
FIG. 14 is a graph showing electric power consumption of the fourth waste electric power control of the electric vehicle according to the embodiment of the present invention.

In FIG. 14, Graphs G3 and G4 are the same line diagrams as those of FIG. 11 of the third waste electric power control. That is, in FIG. 14, the heating operation range of the vehicle air conditioner 10 is indicated by Graph G3 and the isoelectric power line is indicated by Graph G4. Further, a vertical axis indicates a refrigerant flow rate and a horizontal axis indicates a discharge/suction pressure difference of the compressor. In FIG. 14, W1 indicates the electric power consumption of the vehicle air conditioner 10 before the waste electric power control. W3 indicates the electric power consumption of the vehicle air conditioner 10 after the waste electric power control.

Figure 12:
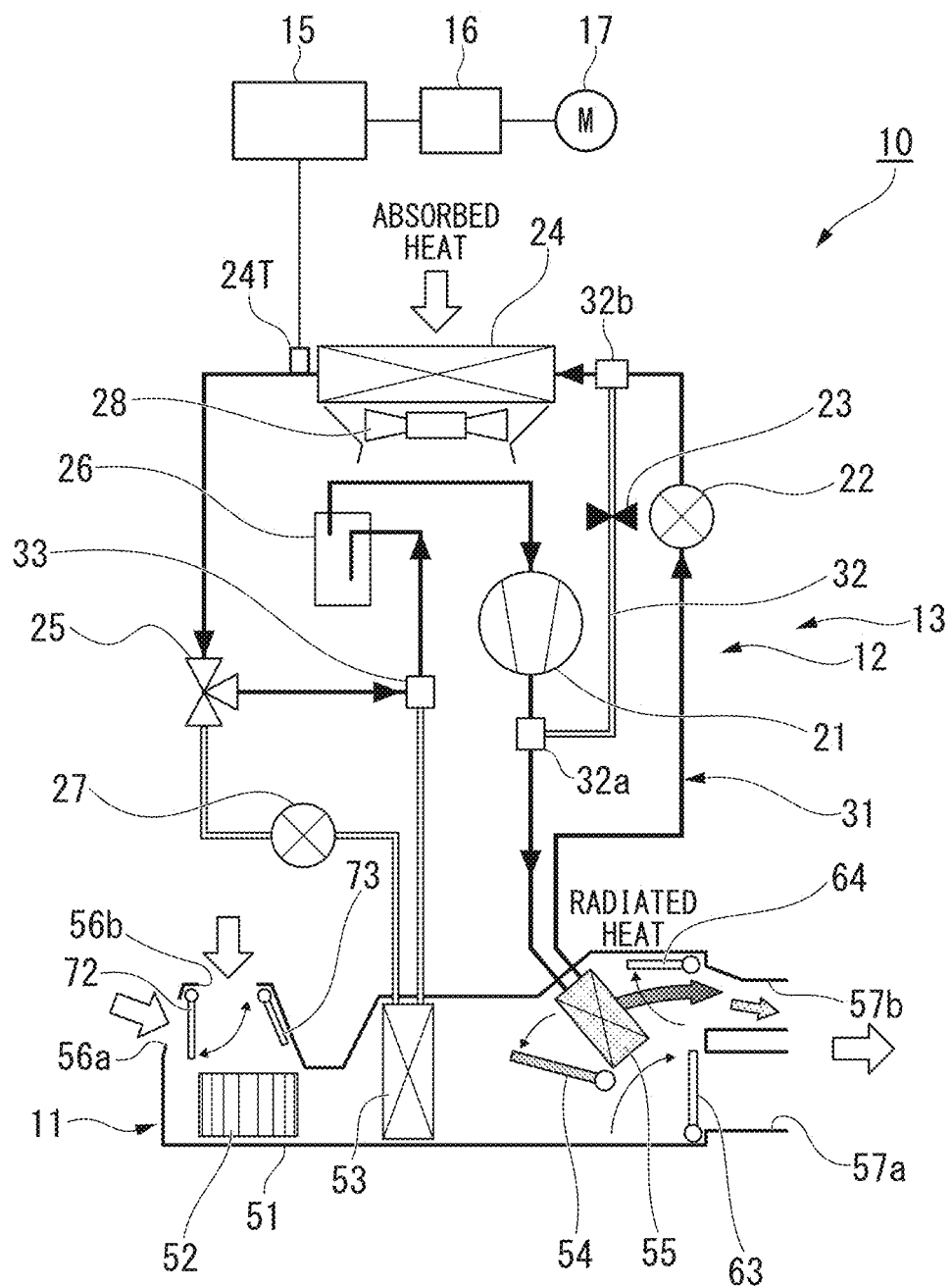
FIG. 12 is a configuration diagram illustrating fourth waste electric power control of the electric vehicle according to the embodiment of the present invention.

As shown in FIG. 12, when the remaining capacity of the power storage device 16 is equal to or larger than a predetermined value, the control device 15 controls the first air guide member 54 so that the passing air volume of the first air guide member 54 decreases as compared with a case in which the remaining capacity of the power storage device 16 is smaller than the predetermined value. Since the passing air volume of the first air guide member 54 decreases, the passing air volume of the first indoor heat exchanger 55 decreases. That is, the volume of air supplied into the vehicle compartment for a heating purpose decreases. Thus, the heating operation efficiency can be decreased as compared with a case before the waste electric power control.

In this state, it is necessary to increase the refrigerant flow rate by increasing the rotation speed of the compressor 21 as shown in FIGS. 12 and 13 in order to obtain the heating capacity before the waste electric power control. Since the rotation speed of the compressor 21 increases, the electric power consumption of the compressor 21 increases from W1 to W3 so that the waste electric power amount of the vehicle air conditioner 10 can be ensured as shown in FIGS. 12 and 14.

Accordingly, in the fourth waste electric power control, when the electric power consumption W3 of the compressor 21 is larger than the electric power generated by the electric motor 17, the overcharging of the power storage device 16 can be prevented. Further, when the electric power consumption W3 of the compressor 21 is smaller than the electric power generated by the electric motor 17, an increase speed of the remaining capacity of the power storage device 16 can be decreased.

Next, an example of increasing the electric power consumption of the vehicle air conditioner 10 by controlling the first expansion valve 22 as well as the compressor 21 and the first air guide member 54 of the vehicle air conditioner 10 will be described with reference to FIGS. 15 to 17 as the fifth waste electric power control.

(Fifth Waste Electric Power Control)

The fifth waste electric power control increases the electric power consumption of the vehicle air conditioner 10 by adding the control of the first expansion valve 22 to the fourth waste electric power control.

Figure 15:
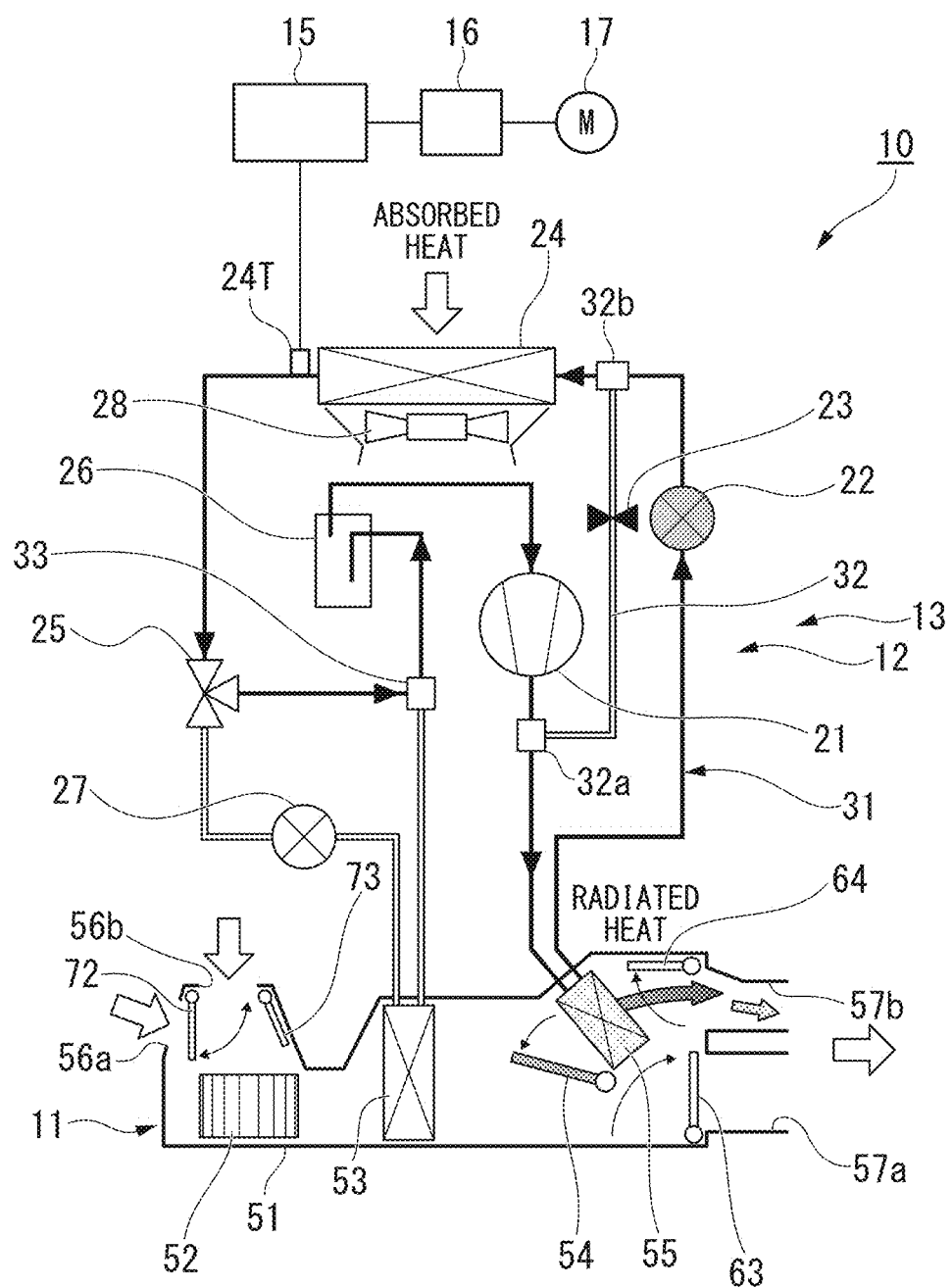
FIG. 15 is a configuration diagram illustrating fifth waste electric power control of the electric vehicle according to the embodiment of the present invention.

FIG. 15 shows a refrigerant pressure-enthalpy line diagram, a vertical axis indicates a refrigerant pressure, and a horizontal axis indicates enthalpy. In FIG. 15, the refrigerant pressure-enthalpy line diagram G1 before the waste electric power control in the heating operation mode is indicated by a solid line. The refrigerant pressure-enthalpy line diagram G1 before the waste electric power control is the same as that of FIG. 10 of the third waste electric power control.

Further, a refrigerant pressure-enthalpy line diagram G6 after the waste electric power control is indicated by a dashed line. In the refrigerant pressure-enthalpy line diagram G6, Point A1→Point B3 indicates the refrigerant state change of the compressor 21. Point B3→Point C3 indicates the refrigerant state change of the first indoor heat exchanger 55. Point C3→Point D1 indicates the refrigerant state change of the first expansion valve 22. Point D1→Point A1 indicates the refrigerant state change of the outdoor heat exchanger 24.

Figure 17:
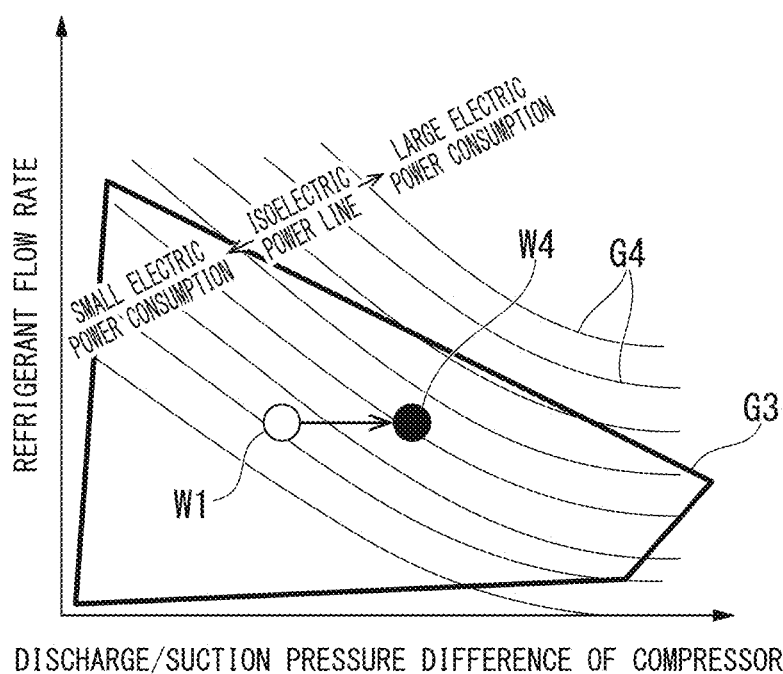
FIG. 17 is a graph illustrating electric power consumption of the fifth waste electric power control of the electric vehicle according to the embodiment of the present invention.

In FIG. 17, Graphs G3 and G4 are the same line diagrams as those of FIG. 11 of the third waste electric power control. That is, in FIG. 17, the heating operation range of the vehicle air conditioner 10 is indicated by Graph G3 and the isoelectric power line is indicated by Graph G4. Further, a vertical axis indicates a refrigerant flow rate and a horizontal axis indicates a discharge/suction pressure difference of the compressor. In FIG. 17, W1 indicates the electric power consumption of the vehicle air conditioner 10 before the waste electric power control. W4 indicates the electric power consumption of the vehicle air conditioner 10 after the waste electric power control.

As shown in FIG. 15, when the remaining capacity of the power storage device 16 is equal to or larger than a predetermined value, the control device 15 controls the first air guide member 54 so that the passing air volume of the first air guide member 54 decreases similarly to the fourth waste electric power control. In addition, the control device 15 controls the opening degree of the first expansion valve 22 so as to decrease as compared with a case in which the remaining capacity of the power storage device 16 is smaller than the predetermined value.

Since the opening degree of the first expansion valve 22 is decreased, the discharge refrigerant pressure of the compressor 21 increases as compared with a case before the waste electric power control. Thus, since the compression efficiency of the compressor 21 is deteriorated and the refrigerant flow rate decreases, the heating operation efficiency can be decreased.

Figure 16:
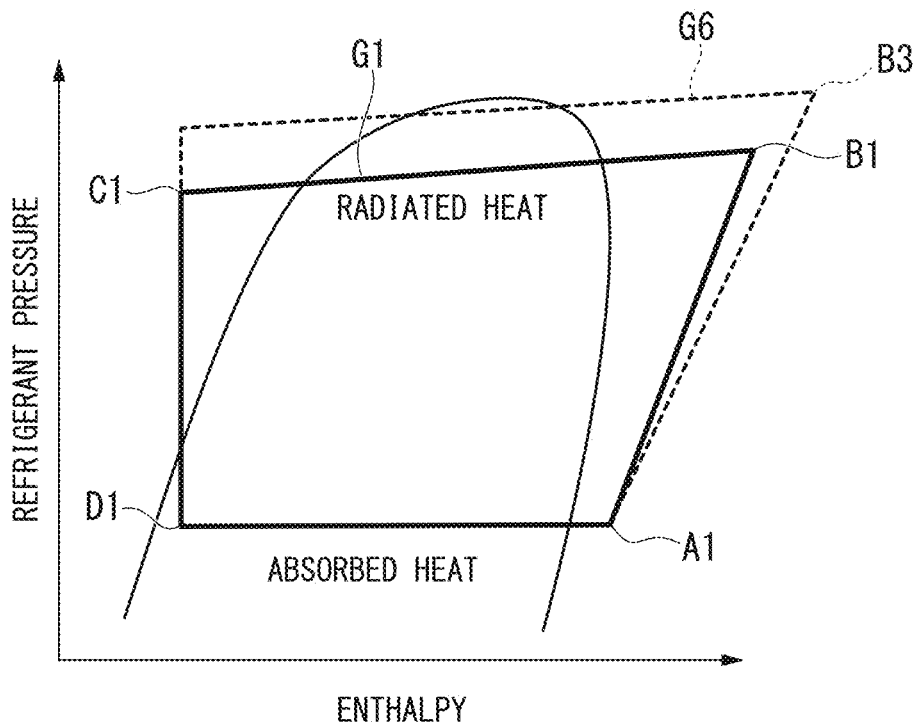
FIG. 16 is a graph showing a refrigerant pressure-enthalpy line diagram of the fifth waste electric power control of the electric vehicle according to the embodiment of the present invention.

In this state, it is necessary to increase the flow rate of the refrigerant discharged from the compressor 21 by increasing the rotation speed of the compressor 21 to be higher than that of the fourth waste electric power control as shown in FIGS. 15 and 16 in order to obtain the heating capacity before the waste electric power control. Since the rotation speed of the compressor 21 increases, the electric power consumption of the compressor 21 increases from W1 to W4 so that the waste electric power amount of the vehicle air conditioner 10 can be ensured as shown in FIGS. 15 and 17.

Accordingly, in the fifth waste electric power control, when the electric power consumption W4 of the compressor 21 is larger than the electric power generated by the electric motor 17, the overcharging of the power storage device 16 can be prevented. Further, when the electric power consumption W4 of the compressor 21 is smaller than the electric power generated by the electric motor 17, an increase speed of the remaining capacity of the power storage device 16 can be decreased.

Further, an example of increasing the electric power consumption of the vehicle air conditioner 10 by controlling the compressor 21 and the first expansion valve 22 of the vehicle air conditioner 10 will be described with reference to FIGS. 18 to 20 as the sixth waste electric power control.

(Sixth Waste Electric Power Control)

Figure 19:
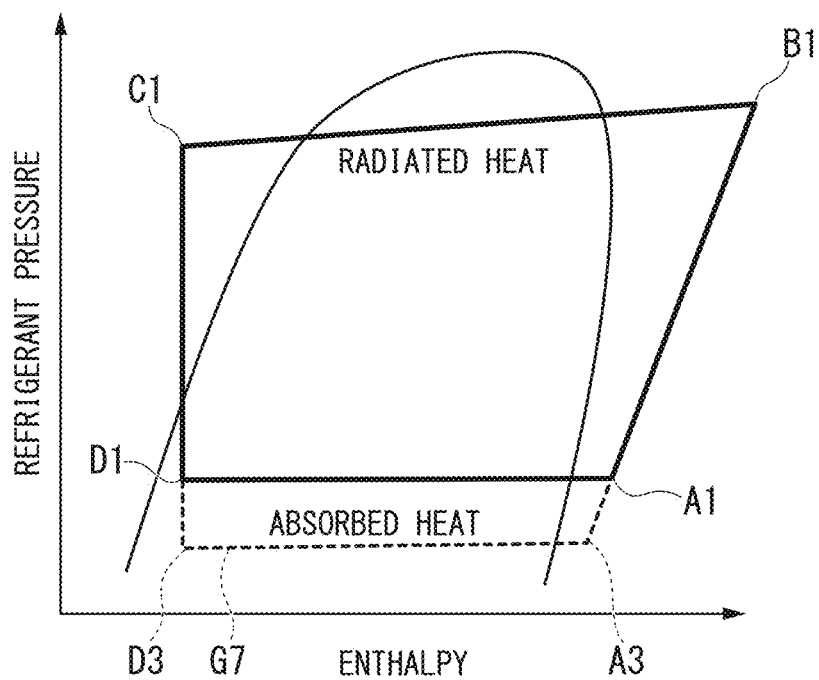
FIG. 19 is a graph showing a refrigerant pressure-enthalpy line diagram of the sixth waste electric power control of the electric vehicle according to the embodiment of the present invention.

FIG. 19 shows a refrigerant pressure-enthalpy line diagram, a vertical axis indicates a refrigerant pressure, and a horizontal axis indicates enthalpy. In FIG. 19, the refrigerant pressure-enthalpy line diagram G1 before the waste electric power control in the heating operation mode is indicated by a solid line. The refrigerant pressure-enthalpy line diagram G1 before the waste electric power control is the same as that of FIG. 10 of the third waste electric power control.

Further, a refrigerant pressure-enthalpy line diagram G7 after the waste electric power control is indicated by a dashed line. In the refrigerant pressure-enthalpy line diagram G7, Point A3→Point B1 indicates the refrigerant state change of the compressor 21. Point B1→Point C1 indicates the refrigerant state change of the first indoor heat exchanger 55. Point C1→Point D3 indicates the refrigerant state change of the first expansion valve 22. Point D3→Point A3 indicates the refrigerant state change of the outdoor heat exchanger 24.

Figure 20:
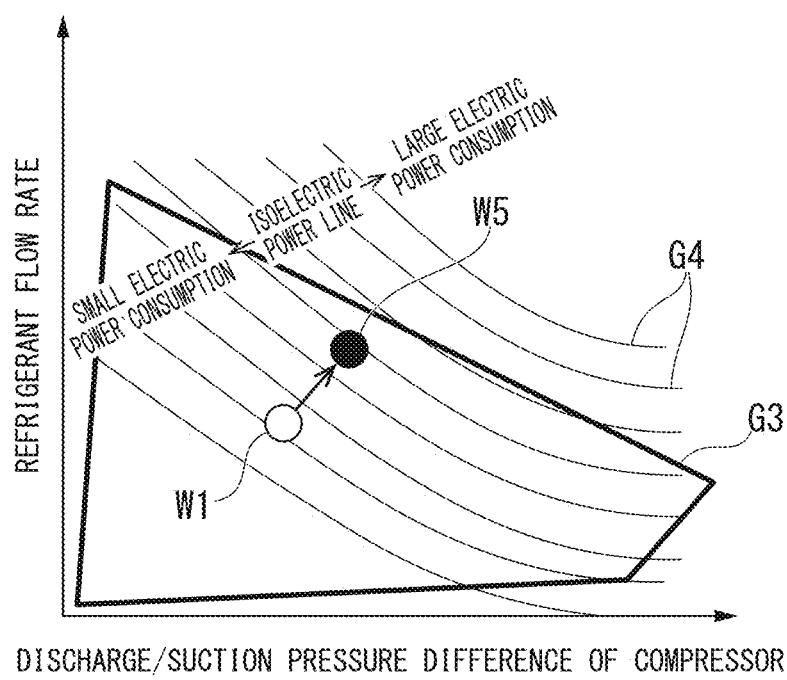
FIG. 20 is a graph illustrating electric power consumption of the sixth waste electric power control of the electric vehicle according to the embodiment of the present invention.

In FIG. 20, Graphs G3 and G4 are the same line diagrams as those of FIG. 11 of the third waste electric power control. That is, in FIG. 20, the heating operation range of the vehicle air conditioner 10 is indicated by Graph G3 and the isoelectric power line is indicated by Graph G4. Further, a vertical axis indicates a refrigerant flow rate and a horizontal axis indicates a discharge/suction pressure difference of the compressor. In FIG. 20, W1 indicates the electric power consumption of the vehicle air conditioner 10 before the waste electric power control. W5 indicates the electric power consumption of the vehicle air conditioner 10 after the waste electric power control.

Figure 18:
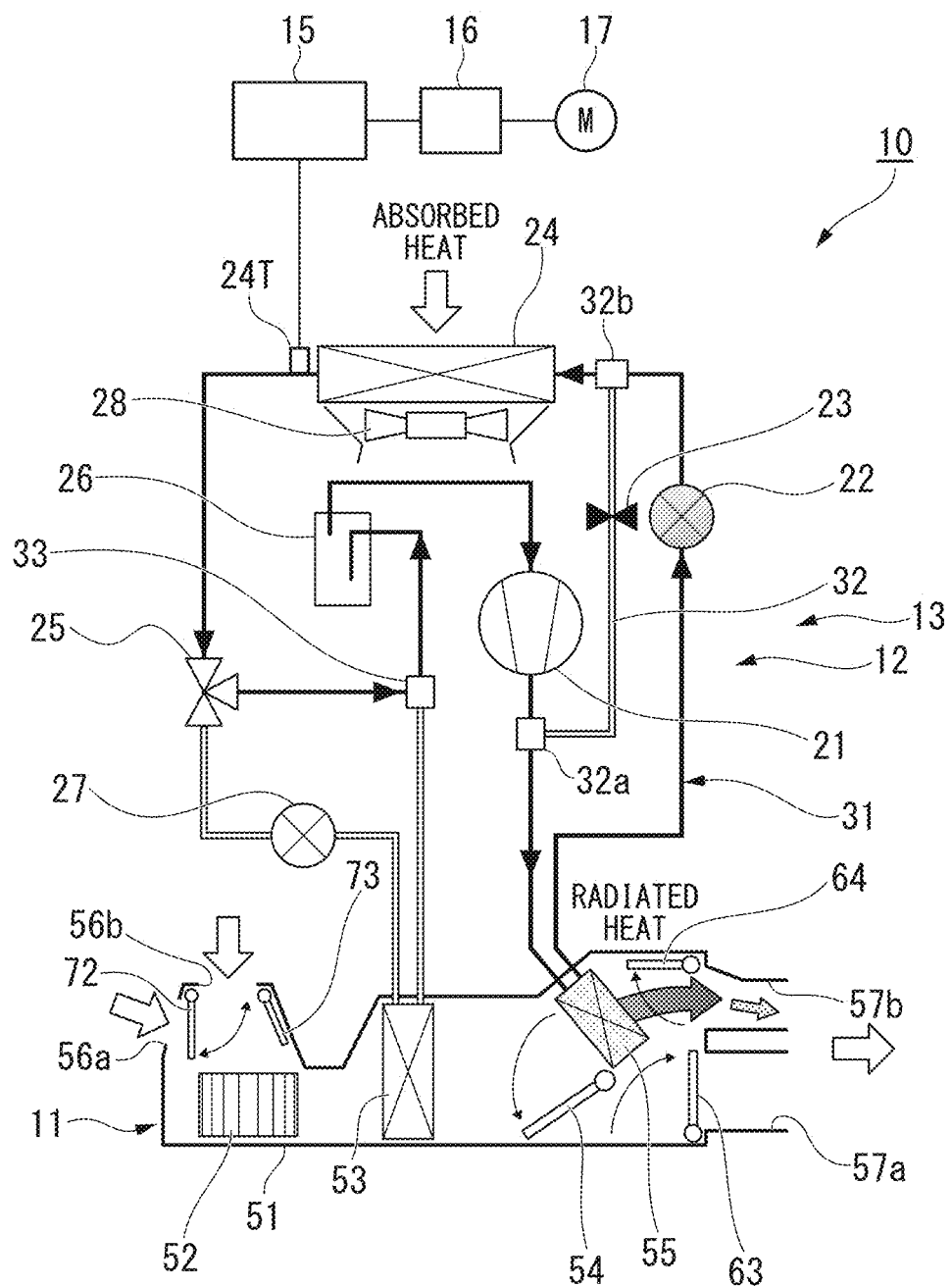
FIG. 18 is a configuration diagram illustrating sixth waste electric power control of the electric vehicle according to the embodiment of the present invention.

As shown in FIG. 18, when the remaining capacity of the power storage device 16 is equal to or larger than a predetermined value, the control device 15 controls the first expansion valve 22 so that the opening degree of the first expansion valve 22 increases as compared with a case in which the remaining capacity of the power storage device 16 is smaller than the predetermined value. When the opening degree of the first expansion valve 22 increases, the refrigerant passing area of the first expansion valve 22 increases. Thus, as shown in FIGS. 18 and 19, the discharge refrigerant pressure of the compressor 21 decreases as compared with a case before the waste electric power control. Accordingly, it is possible to decrease the heating operation efficiency of the vehicle air conditioner 10 as compared with a case before the waste electric power control.

In this state, in order to obtain the heating capacity before the waste electric power control, it is necessary to increase the pressure of the refrigerant supplied to the first indoor heat exchanger 55. That is, it is necessary to increase the flow rate of the refrigerant discharged from the compressor 21 by increasing the rotation speed of the compressor 21. Since the rotation speed of the compressor 21 increases, the electric power consumption of the compressor 21 increases from W1 to W5 so that the waste electric power amount of the vehicle air conditioner 10 can be ensured as shown in FIGS. 18 and 20.

Accordingly, in the sixth waste electric power control, when the electric power consumption W5 of the compressor 21 is larger than the electric power generated by the electric motor 17, the overcharging of the power storage device 16 can be prevented. Further, when the electric power consumption W5 of the compressor 21 is smaller than the electric power generated by the electric motor 17, an increase speed of the remaining capacity of the power storage device 16 can be decreased.

Next, an example of increasing the electric power consumption of the vehicle air conditioner 10 by controlling the opening degree of the first expansion valve 22 to a full open state from the sixth waste electric power control state will be described with reference to FIGS. 21 to 23 as the seventh waste electric power control.

(Seventh Waste Electric Power Control)

Figure 22:
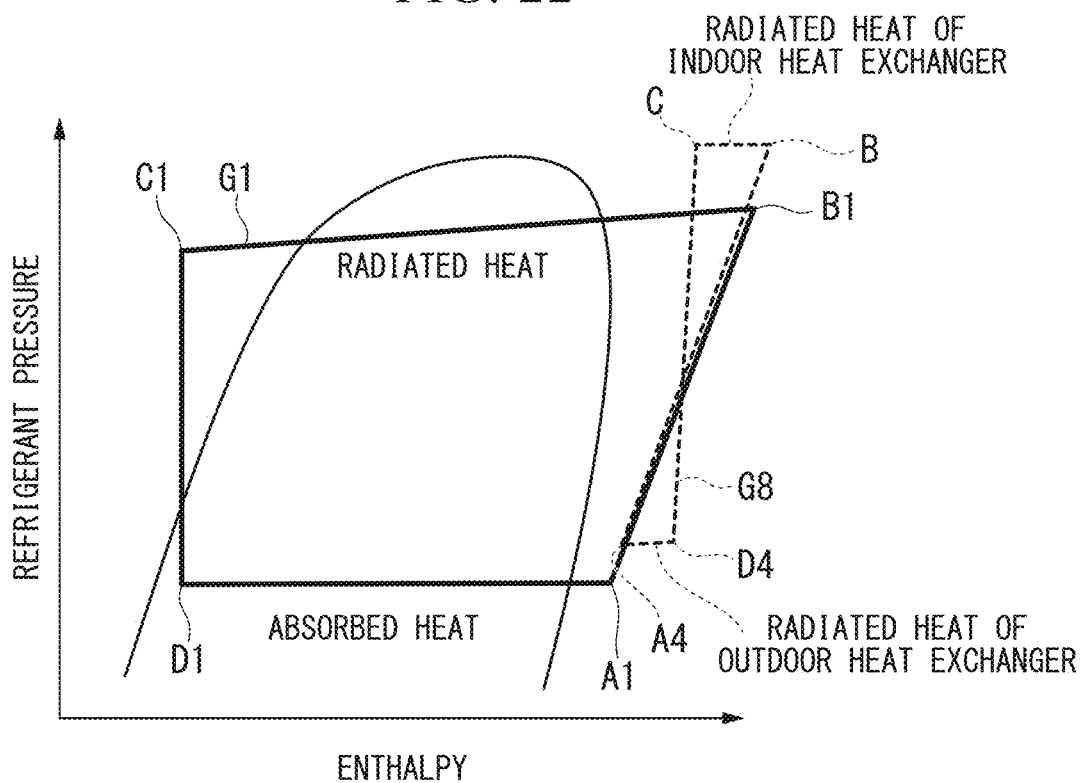
FIG. 22 is a graph showing a refrigerant pressure-enthalpy line diagram of the seventh waste electric power control of the electric vehicle according to the embodiment of the present invention.

FIG. 22 shows a refrigerant pressure-enthalpy line diagram, a vertical axis indicates a refrigerant pressure, and a horizontal axis indicates enthalpy. In FIG. 22, the refrigerant pressure-enthalpy line diagram G1 before the waste electric power control in the heating operation mode is indicated by a solid line. The refrigerant pressure-enthalpy line diagram G1 before the waste electric power control is the same as that of FIG. 10 of the third waste electric power control.

Further, a refrigerant pressure-enthalpy line diagram G8 after the waste electric power control is indicated by a dashed line. In the refrigerant pressure-enthalpy line diagram G8, Point A4→Point B4 indicates the refrigerant state change of the compressor 21. Point B4→Point C4 indicates the refrigerant state change of the first indoor heat exchanger 55. Point C4→Point D4 indicates the refrigerant state change of the first expansion valve 22. Point D4→Point A4 indicates the refrigerant state change of the outdoor heat exchanger 24.

Figure 23:
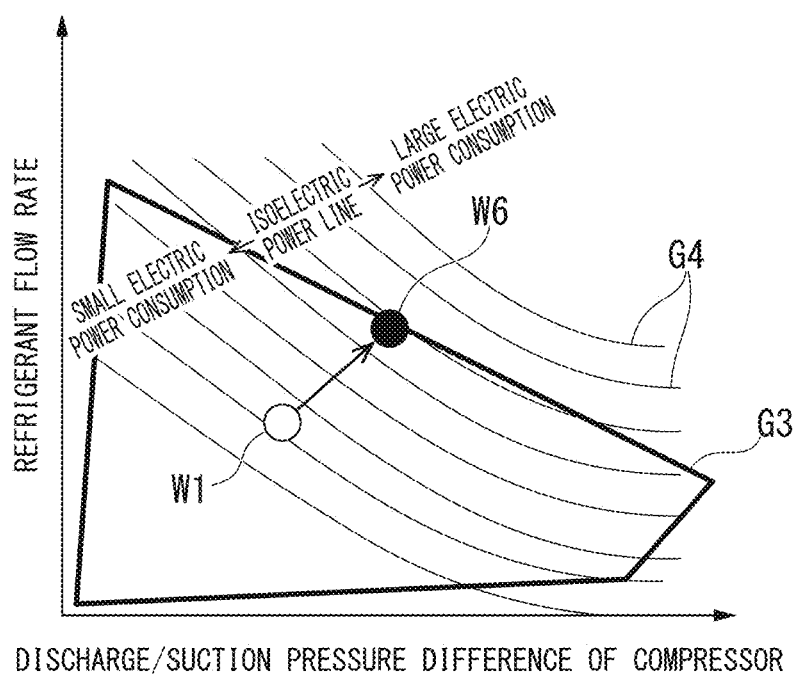
FIG. 23 is a graph illustrating electric power consumption of the seventh waste electric power control of the electric vehicle according to the embodiment of the present invention.

In FIG. 23, Graphs G3 and G4 are the same line diagrams as those of FIG. 11 of the third waste electric power control. That is, in FIG. 23, the heating operation range of the vehicle air conditioner 10 is indicated by Graph G3 and the isoelectric power line is indicated by Graph G4. Further, a vertical axis indicates a refrigerant flow rate and a horizontal axis indicates a discharge/suction pressure difference of the compressor. In FIG. 23, W1 indicates the electric power consumption of the vehicle air conditioner 10 before the waste electric power control. W6 indicates the electric power consumption of the vehicle air conditioner 10 after the waste electric power control.

Figure 21:
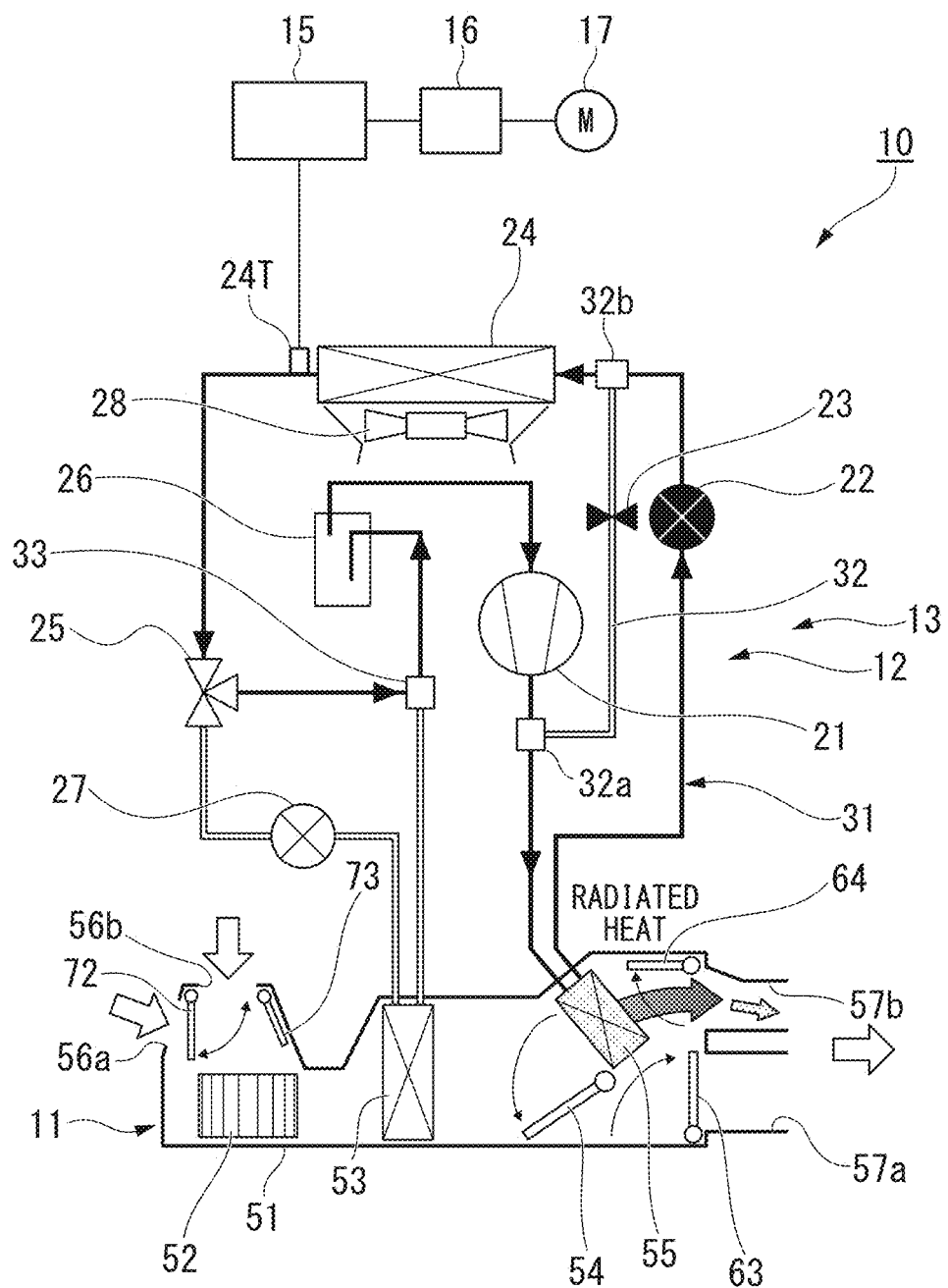
FIG. 21 is a configuration diagram illustrating seventh waste electric power control of the electric vehicle according to the embodiment of the present invention.

As shown in FIG. 21, when the remaining capacity of the power storage device 16 is equal to or larger than a predetermined value, the control device 15 controls the opening degree of the first expansion valve 22 to a full open state from the sixth waste electric power control state. Since the opening degree of the first expansion valve 22 is fully opened, the refrigerant passing area of the first expansion valve 22 increases to maximum. The heating operation mode of the vehicle air conditioner 10 is shifted to a hot gas operation as indicated by Graph G8 of FIG. 22 as compared with a case before the waste electric power control so that heat cannot be absorbed by the outdoor heat exchanger 24. That is, the workload of the compressor 21 (see FIG. 21) is equivalent to the heating capacity.

Thus, as shown in FIGS. 21 and 22, it is necessary to increase the rotation speed of the compressor 21 as compared with the sixth waste electric power control state in order to ensure the same heating capacity of the vehicle air conditioner 10 as that of a case before the waste electric power control. Since the rotation speed of the compressor 21 is increased, the discharge pressure of the refrigerant discharged from the compressor 21 increases and the flow rate of the refrigerant increases so that the same heating capacity as that of a case before the waste electric power control is ensured.

Meanwhile, since the rotation speed of the compressor 21 increases more than the sixth waste electric power control state, the electric power consumption of the compressor 21 increases from W1 to W6 so that the waste electric power amount of the vehicle air conditioner 10 can be ensured as shown in FIGS. 21 and 23.

Accordingly, in the seventh waste electric power control, when the electric power consumption W6 of the compressor 21 is larger than the electric power generated by the electric motor 17, the overcharging of the power storage device 16 can be prevented. Further, when the electric power consumption W6 of the compressor 21 is smaller than the electric power generated by the electric motor 17, an increase speed of the remaining capacity of the power storage device 16 can be decreased.

Next, an example of increasing the electric power consumption of the vehicle air conditioner 10 by sequentially performing the third to seventh waste electric power control of the vehicle air conditioner 10 from a control having the smallest electric power consumption will be described with reference to a flowchart of FIG. 24 as the eighth waste electric power control.

(Eighth Waste Electric Power Control)

The electric power consumption (that is, the waste electric power amounts) W2 to W6 of the third to seventh waste electric power control will be set as, for example, the first waste electric power amount W2<the second waste electric power amount W3<the third waste electric power amount W4<the fourth waste electric power amount W5<the fifth waste electric power amount W6. Furthermore, the first to fifth waste electric power amounts W2 to W6 are different in accordance with the specification or the like of the electric vehicle Ve.

Figure 24:
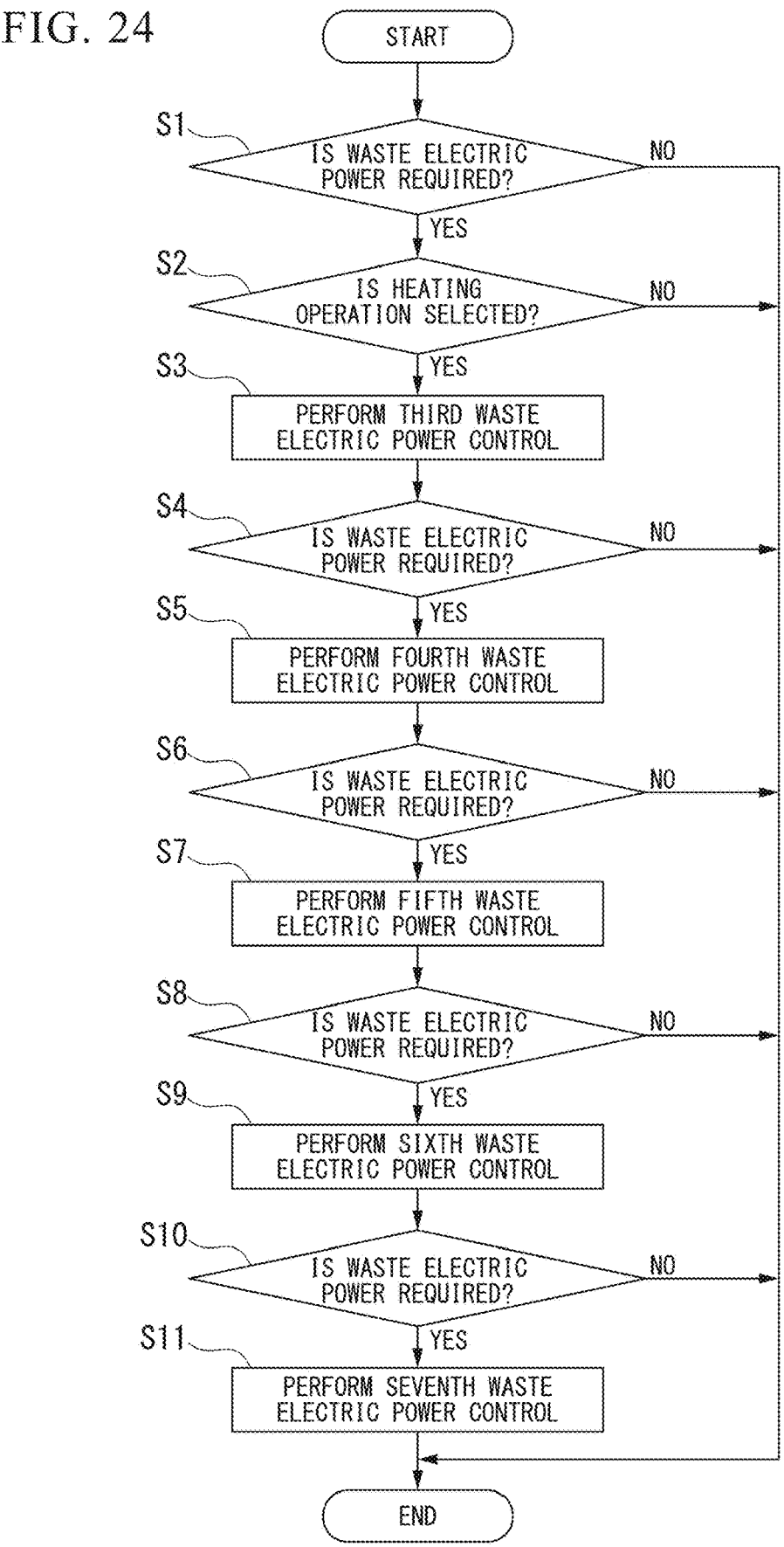
FIG. 24 is a flowchart illustrating eighth waste electric power control of the electric vehicle according to the embodiment of the present invention.

As shown in FIG. 24, for example, when the electric vehicle Ve is braked while the electric vehicle Ve is traveling on a long down slope in the heating operation mode, the rotation of the drive wheel is transmitted to the output shaft of the electric motor 17 and the electric power is regenerated by the electric motor 17 in accordance with the rotation of the output shaft. The AC current regenerated by the electric motor 17 is converted into a DC current by the inverter. The converted DC current is supplied from the inverter to the power storage device 16 to be charged in the power storage device 16.

In this state, in step S1, the control device 15 determines whether the remaining capacity of the power storage device 16 is equal to or larger than a predetermined value (that is, the waste electric power is required) on the basis of the chargeable electric power. When it is determined that the waste electric power is not necessary, the waste electric power control ends. Meanwhile, when it is determined that the waste electric power is necessary, the routine proceeds to step S2. In step S2, the vehicle air conditioner 10 determines whether the heating operation mode is selected.

When it is determined that the heating operation mode is not selected, the waste electric power control ends. Meanwhile, when it is determined that the heating operation mode is selected, the routine proceeds to step S3. In step S3, the third waste electric power control is performed. That is, the compressor 21 and the second air guide member 28 of the vehicle air conditioner 10 are controlled so that the electric power consumption of the vehicle air conditioner 10 is increased from W1 to W2.

In this state, in step S4, it is determined whether the remaining capacity of the power storage device 16 is equal to or larger than a predetermined value (that is, the waste electric power is required) on the basis of the chargeable electric power. When it is determined that the waste electric power is not required, the waste electric power control ends. Meanwhile, when it is determined that the waste electric power is required, the routine proceeds to step S5. In step S5, the fourth waste electric power control is performed. That is, the compressor 21 and the first air guide member 54 of the vehicle air conditioner 10 are controlled so that the electric power consumption of the vehicle air conditioner 10 is increased from W2 to W3.

In this state, in step S6, it is determined whether the remaining capacity of the power storage device 16 is equal to or larger than a predetermined value (that is, the waste electric power is required) on the basis of the chargeable electric power. When it is determined that the waste electric power is not required, the waste electric power control ends. Meanwhile, when it is determined that the waste electric power is required, the routine proceeds to step S7. In step S7, the fifth waste electric power control is performed. That is, the first expansion valve 22 is controlled as well as the compressor 21 and the first air guide member 54 of the vehicle air conditioner 10 so that the electric power consumption of the vehicle air conditioner 10 is increased from W3 to W4.

In this state, in step S8, it is determined whether the remaining capacity of the power storage device 16 is equal to or larger than a predetermined value (that is, the waste electric power is required) on the basis of the chargeable electric power. When it is determined that the waste electric power is not required, the waste electric power control ends. Meanwhile, when it is determined that the waste electric power is required, the routine proceeds to step S9. In step S9, the sixth waste electric power control is performed. That is, the compressor 21 and the first expansion valve 22 of the vehicle air conditioner 10 are controlled so that the electric power consumption of the vehicle air conditioner 10 is increased from W4 to W5.

In this state, in step S10, it is determined whether the remaining capacity of the power storage device 16 is equal to or larger than a predetermined value (that is, the waste electric power is required) on the basis of the chargeable electric power. When it is determined that the waste electric power is not required, the waste electric power control ends. Meanwhile, when it is determined that the waste electric power is required, the routine proceeds to step S11. In step S11, the seventh waste electric power control is performed. That is, the opening degree of the first expansion valve 22 is controlled to a full open state from the sixth waste electric power control state so that the electric power consumption of the vehicle air conditioner 10 is increased from W5 to W6. In this way, since the third waste electric power control to the seventh waste electric power control are sequentially and selectively performed from the waste electric power control having the smallest electric power consumption, the excessive waste electric power of the regenerative electric power can be prevented.

As described in step S1 to step S11 of FIG. 24, when the remaining capacity of the power storage device 16 is equal to or larger than a predetermined value, the control device 15 controls the vehicle air conditioner 10 in response to the regenerative electric power amount of the electric motor (the traveling motor) 17. Specifically, the first expansion valve 22, the second air guide member 28, and the first air guide member 54 are selectively controlled along with the operation of the compressor 21. Thus, it is possible to decrease the efficiency of the heating operation according to the regenerative electric power amount.

In this way, in the eighth waste electric power control, it is possible to satisfy the waste electric power request while preventing the excessive waste electric power by sequentially performing the third to seventh waste electric power control having different waste electric power amounts from the waste electric power control having the smallest waste electric power amount. In other words, it is possible to prevent a state in which the regeneration is not possible (the regenerative torque is insufficient) due to the complete charging of the power storage device 16 while preventing the excessive waste electric power of the electric power regenerated by the electric motor 17 and a deterioration of SOC at the time of ending the regeneration.

Next, an example of performing the ninth waste electric power control to the thirteenth waste electric power control so that the remaining capacity of the power storage device 16 does not exceed a predetermined value at the time of storing the regenerative electric power in the power storage device 16 in the cooling operation mode or the dehumidifying heating operation mode of the vehicle air conditioner 10 will be described with reference to FIGS. 25 to 32 and Tables 1 and 2.

First, the ninth to thirteenth waste electric power control can be exemplified as the waste electric power control of the vehicle air conditioner 10 in the cooling operation mode. Hereinafter, the ninth to thirteenth waste electric power control will be sequentially described.

An example of increasing the electric power consumption of the vehicle air conditioner 10 by closing the first bypass valve 23 of the vehicle air conditioner 10 and throttling the first expansion valve 22 will be described with reference to FIG. 25 as the ninth waste electric power control.

(Ninth Waste Electric Power Control)

Figure 25:
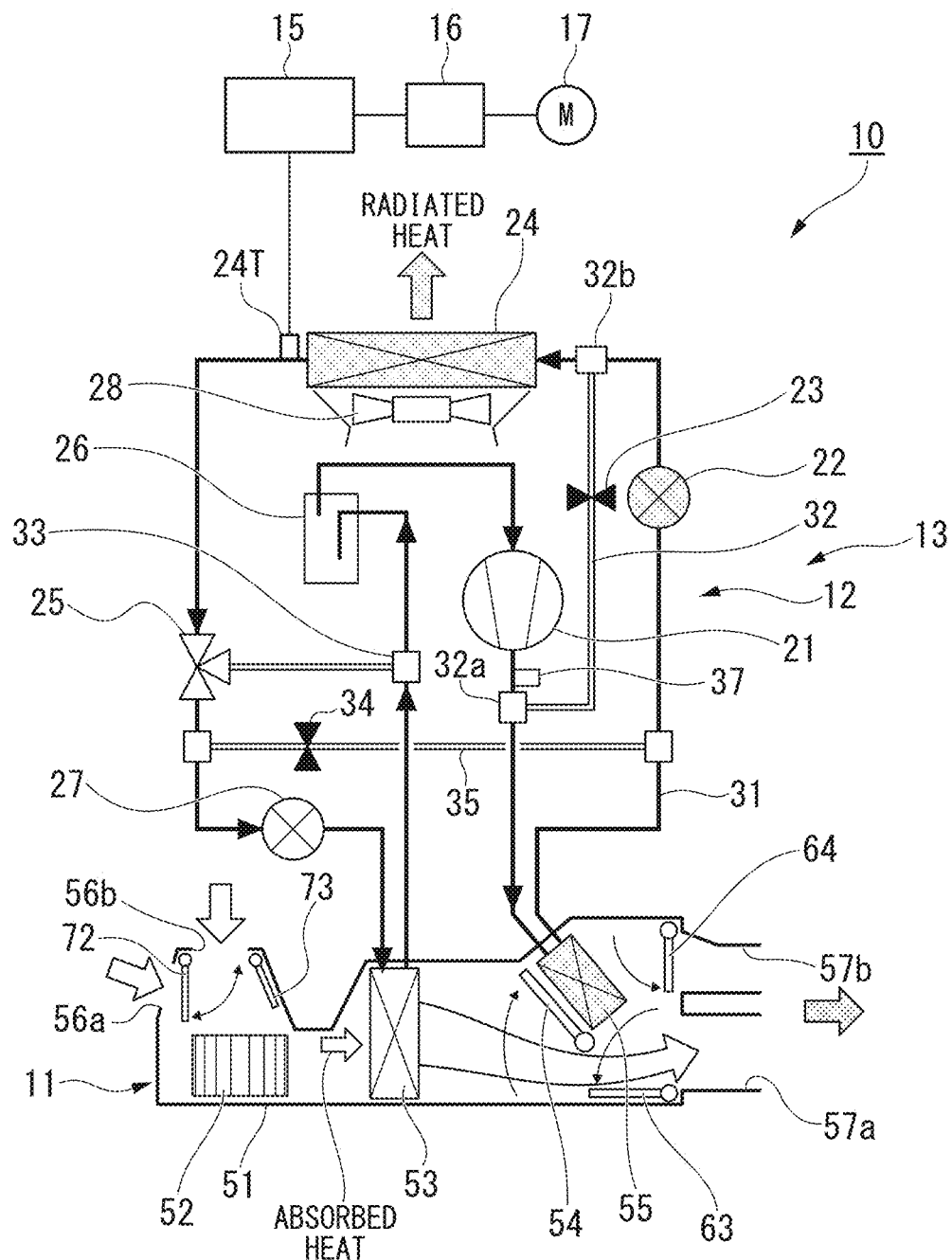
FIG. 25 is a configuration diagram illustrating ninth waste electric power control of the electric vehicle according to the embodiment of the present invention.

As shown in FIG. 25, when the remaining capacity of the power storage device 16 is equal to or larger than a predetermined value, the control device 15 controls the first bypass valve 23 along with the operation of the compressor 21 to close the first bypass valve 23 so that the passage resistance of the first expansion valve 22 increases as compared with a case in which the remaining capacity of the power storage device 16 is smaller than a predetermined value.

In the ninth waste electric power control, when the remaining capacity of the power storage device 16 is equal to or larger than a predetermined value during the operation of the compressor 21, the passage resistance is increased by throttling the first expansion valve 22. Thus, since the resistance of the passage extending from the compressor 21 to the outdoor heat exchanger 24 increases as compared with a case before the waste electric power control, the pressure loss (the friction loss) increases so that the refrigerant circulation amount inside the refrigerant passage 31 can be decreased. That is, it is possible to decrease the efficiency of the cooling operation or the dehumidifying cooling operation of the vehicle air conditioner 10.

In this state, it is necessary to increase the refrigerant flow rate by increasing the rotation speed of the compressor 21 in order to obtain the cooling capacity before the waste electric power control. Since the rotation speed of the compressor 21 increases, the electric power consumption of the compressor 21 increases so that the waste electric power amount of the vehicle air conditioner 10 can be ensured.

Accordingly, in the ninth waste electric power control, when the electric power consumption of the compressor 21 is larger than the electric power generated by the electric motor 17, the overcharging of the power storage device 16 can be prevented. Further, when the electric power consumption of the compressor 21 is smaller than the electric power generated by the electric motor 17, an increase speed of the remaining capacity of the power storage device 16 can be decreased.

For example, the compressor 21 is controlled by using information of a temperature sensor or the like provided in the second indoor heat exchanger 53 so that the temperature of the second indoor heat exchanger 53 becomes the target value.

The throttle control of the first expansion valve 22 can be limited in response to the required waste electric power amount within the upper limit of the discharge pressure of the compressor 21. The target value of the discharge pressure sensor 37 is set in response to the required waste electric power amount.

The workload (the electric power consumption) of the compressor 21 increases due to an increase in compression work, an increase in required flow rate of the refrigerant with an increase in outlet enthalpy of the outdoor heat exchanger 24, and an increase in rotation speed with a decrease in volume efficiency. At this time, since the temperature of the first indoor heat exchanger 55 increases, for example, the opening degree of the first air guide member 54 is made smaller in order to set the temperature (heat radiation quantity) of air blown out from the air outlet 57a as a target value. The increased electric power work is mainly discharged as thermal energy from the outdoor heat exchanger 24. Furthermore, in the case of the dehumidifying cooling operation, the opening degree of the first air guide member 54 is larger than that of the cooling operation and becomes an intermediate opening degree between a full closed state and a full open state (not shown).

Next, an example of increasing the electric power consumption of the vehicle air conditioner 10 by opening the first bypass valve 23 of the vehicle air conditioner 10 to control the second air guide member 28 will be described with reference to FIG. 26 as the tenth waste electric power control.

(Tenth Waste Electric Power Control)

Figure 26:
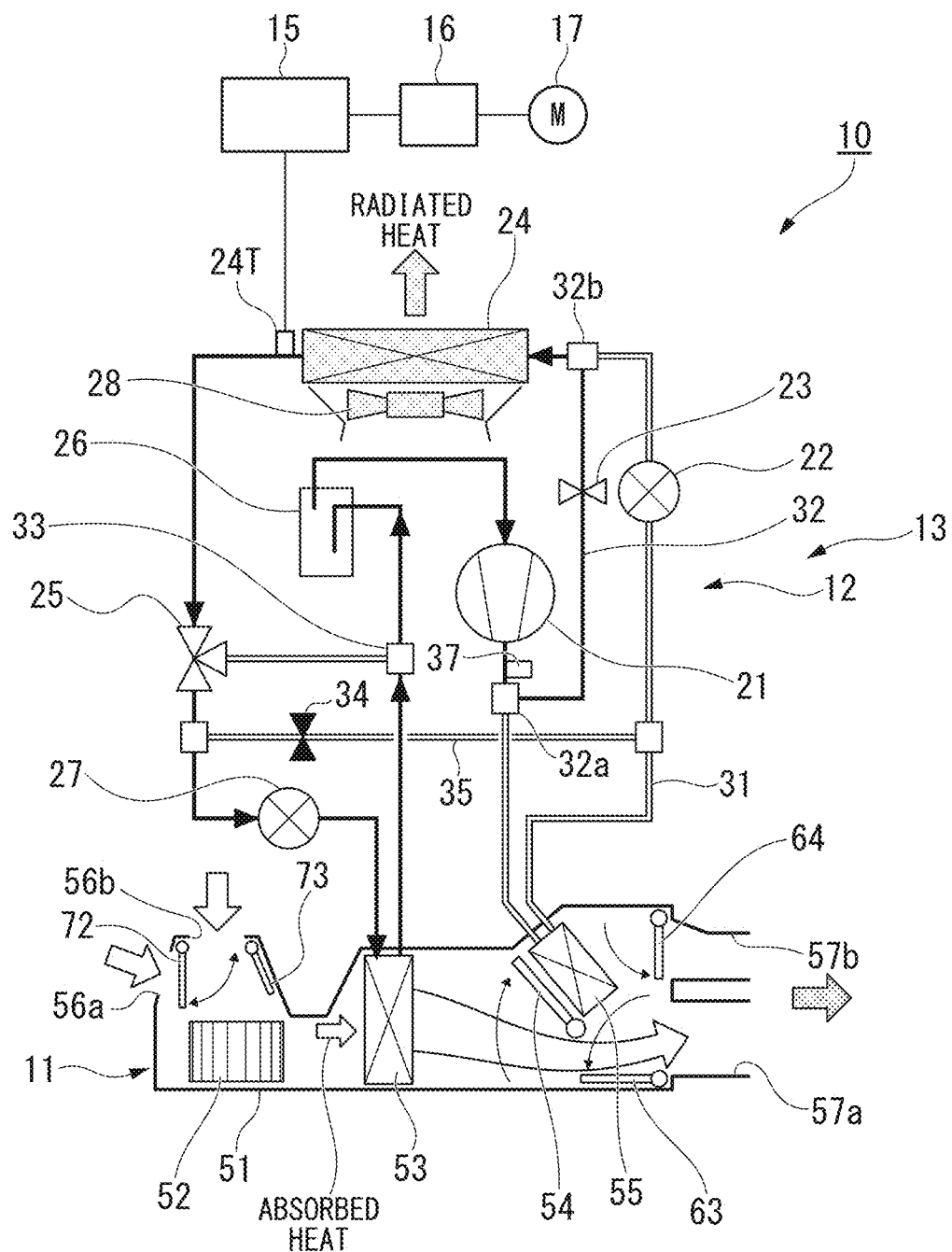
FIG. 26 is a configuration diagram illustrating tenth waste electric power control of the electric vehicle according to the embodiment of the present invention.

As shown in FIG. 26, when the remaining capacity of the power storage device 16 is equal to or larger than a predetermined value, the control device opens the first bypass valve 23 along with the operation of the compressor 21. Furthermore, the passing air volume of the second air guide member 28 controlling the passing air volume of the outdoor heat exchanger 24 is controlled to be smaller than that of a case in which the remaining capacity of the power storage device 16 is smaller than a predetermined value.

That is, when the second air guide member 28 is a condenser fan, the rotation speed of the fan is decreased or stopped to decrease the passing air volume of the second air guide member 28.

In this case, for example, the second air guide member 28 can be decreased in speed in response to the required waste electric power amount within the upper limit of the discharge pressure of the compressor 21. The target value of the discharge pressure sensor 37 is set in response to the required waste electric power amount.

Further, when the second air guide member 28 is a grille shutter, a gap of the grille shutter is narrowed or the grille shutter is closed to decrease the passing air volume of the second air guide member 28.

Here, since the air resistance of the traveling vehicle decreases when the grille shutter is closed, there is concern of discomfort in the brake feeling since the vehicle speed increases even when the waste electric power amount increases.

Therefore, in order to obtain the vehicle speed reduction feeling as in the case before the operation of the grille shutter, the grille shutter operation is determined by the following condition. That is, when a relationship of (the possible waste electric power due to the tenth waste electric power control)>(the regenerative electric power reduction amount due to the grille shutter operation) is established in (the discharge pressure of the discharge pressure sensor 37)<(the upper-limit discharge pressure of the compressor 21), the regenerative electric power reduction amount X due to the grille shutter operation is calculated by the characteristic of the graph of FIG. 27.

Figure 27:
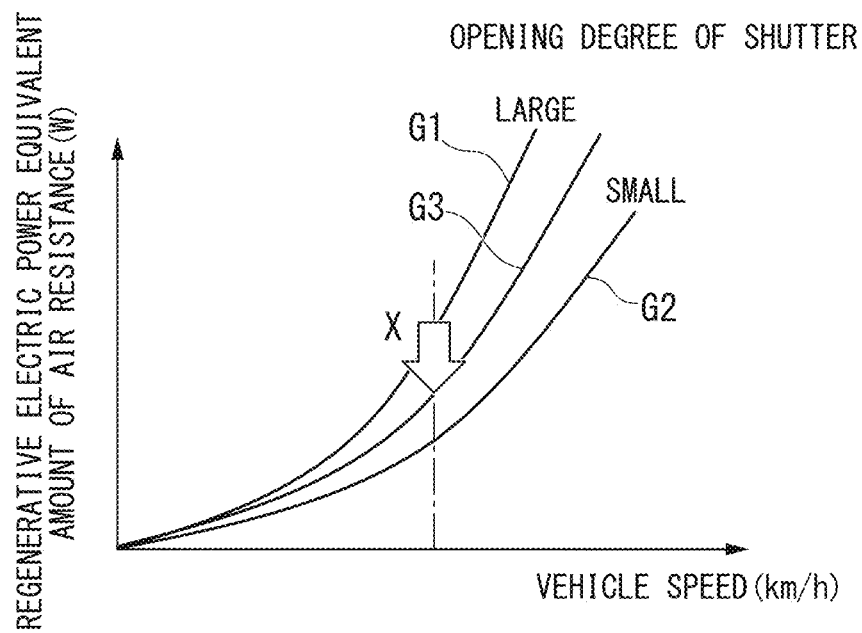
FIG. 27 is a graph showing calculation of a regenerative electric power reduction amount using a grille shutter operation of the electric vehicle according to the embodiment of the present invention.

In the graph of FIG. 27, a vertical axis indicates a regenerative electric power equivalent amount (W) of the air resistance. The "regenerative electric power equivalent amount (W) of the air resistance" indicates the regenerative electric power when regeneration gives the same amount of resistance as the air resistance. A horizontal axis indicates a vehicle speed (km/h). Graphs G1 to G3 indicate the degree of the opening degree of the grille shutter.

When the passing air volume of the second air guide member 28 is decreased, the passing air volume of the outdoor heat exchanger 24 is decreased and hence the heat radiation amount of the outdoor heat exchanger 24 can be decreased.

Here, the refrigerant passing through the first bypass valve 23 flows into the outdoor heat exchanger 24 at a high pressure and a high temperature. Thus, since the heat radiation amount of the outdoor heat exchanger 24 decreases, the high temperature and the high pressure of the refrigerant increase. Thus, it is possible to decrease the efficiency of the cooling operation or the dehumidifying cooling operation of the vehicle air conditioner 10.

In this state, it is necessary to increase the refrigerant flow rate by increasing the rotation speed of the compressor 21 in order to obtain the cooling capacity before the waste electric power control. Since the rotation speed of the compressor 21 increases, the electric power consumption of the compressor 21 increases so that the waste electric power amount of the vehicle air conditioner 10 can be ensured.

Accordingly, in the tenth waste electric power control, when the electric power consumption of the compressor 21 is larger than the electric power generated by the electric motor 17, the overcharging of the power storage device 16 can be prevented. Further, when the electric power consumption of the compressor 21 is smaller than the electric power generated by the electric motor 17, an increase speed of the remaining capacity of the power storage device 16 can be decreased.

For example, the compressor 21 is controlled by using information of a temperature sensor or the like provided in the second indoor heat exchanger 53 so that the temperature of the second indoor heat exchanger 53 becomes the target value.

The workload (the electric power consumption) of the compressor 21 increases due to an increase in compression work, an increase in required flow rate of the refrigerant with an increase in outlet enthalpy of the outdoor heat exchanger 24, and an increase in rotation speed with a decrease in volume efficiency. At this time, since the temperature of the first indoor heat exchanger 55 increases, for example, the opening degree of the first air guide member 54 is made smaller in order to set the temperature (heat radiation quantity) of air blown out from the air outlet 57a as a target value. The increased electric power work is mainly discharged as thermal energy from the outdoor heat exchanger 24. Furthermore, in the case of the dehumidifying cooling operation, the opening degree of the first air guide member 54 is larger than that of the cooling operation and becomes an intermediate opening degree between a full closed state and a full open state (not shown).

Next, an example of increasing the electric power consumption of the vehicle air conditioner 10 by opening the first bypass valve 23 of the vehicle air conditioner 10 and decreasing the opening degree of the second expansion valve 27 will be described with reference to FIG. 28 as the eleventh waste electric power control.

(Eleventh Waste Electric Power Control)

Figure 28:
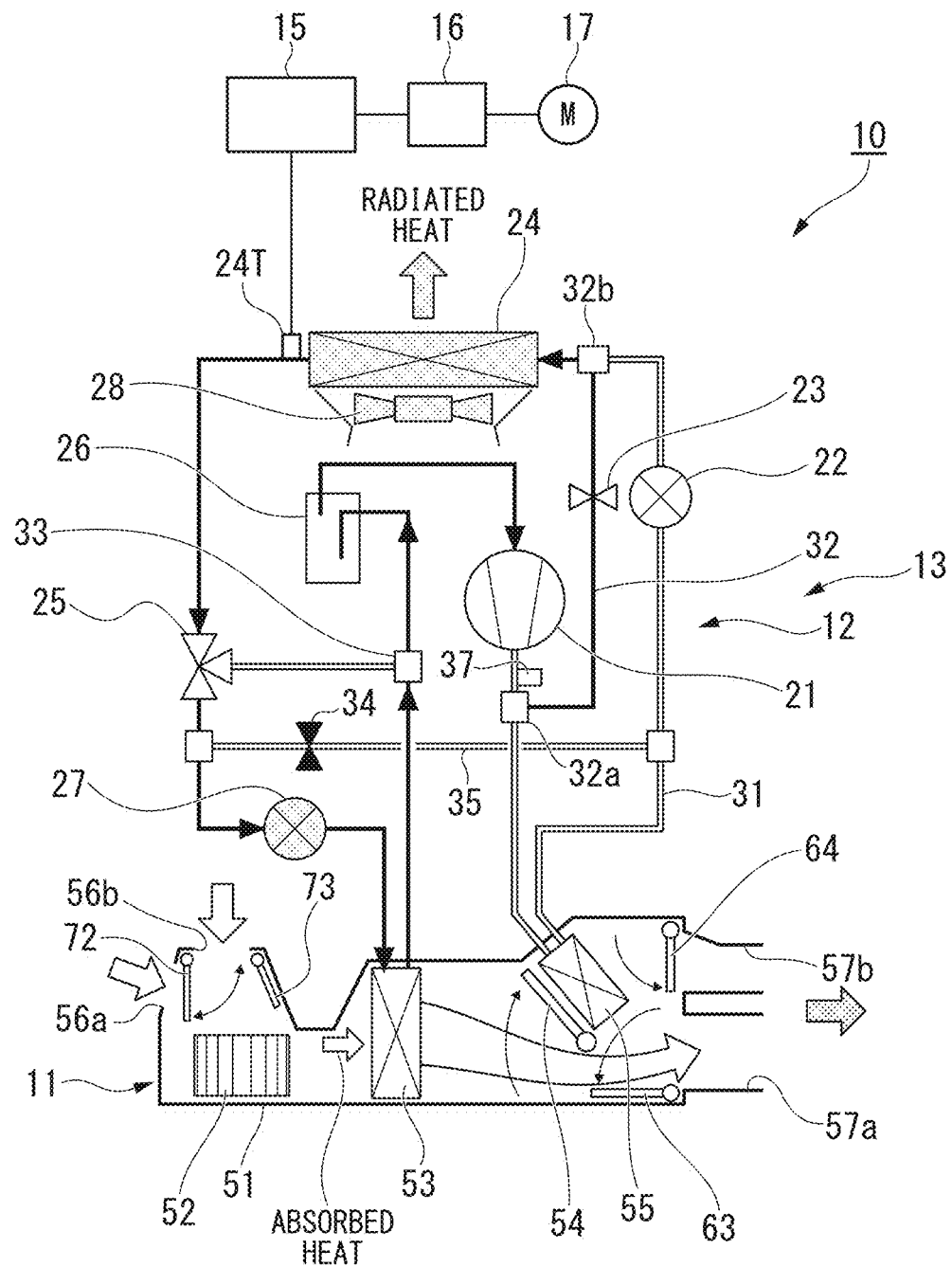
FIG. 28 is a configuration diagram illustrating eleventh waste electric power control of the electric vehicle according to the embodiment of the present invention.

As shown in FIG. 28, when the remaining capacity of the power storage device 16 is equal to or larger than a predetermined value, the control device 15 throttles the second expansion valve 27 along with the operation of the compressor 21. When the second expansion valve 27 is throttled, the opening degree of the second expansion valve 27 is decreased as compared with a case in which the remaining capacity of the power storage device 16 is smaller than a predetermined value.

In the eleventh waste electric power control, when the remaining capacity of the power storage device 16 is equal to or larger than a predetermined value during the operation of the compressor 21, the opening degree of the second expansion valve 27 is decreased. Thus, it is possible to decrease the refrigerant circulation amount inside the refrigerant passage 31 extending from the compressor 21 to the outdoor heat exchanger 24 as compared with a case before the waste electric power control. That is, it is possible to decrease the efficiency of the cooling operation or the dehumidifying cooling operation of the vehicle air conditioner 10.

In this state, it is necessary to increase the refrigerant flow rate by increasing the rotation speed of the compressor 21 in order to obtain the cooling capacity before the waste electric power control. Since the rotation speed of the compressor 21 increases, the electric power consumption of the compressor 21 increases so that the waste electric power amount of the vehicle air conditioner 10 can be ensured.

Accordingly, in the eleventh waste electric power control, when the electric power consumption of the compressor 21 is larger than the electric power generated by the electric motor 17, the overcharging of the power storage device 16 can be prevented. Further, when the electric power consumption of the compressor 21 is smaller than the electric power generated by the electric motor 17, an increase speed of the remaining capacity of the power storage device 16 can be decreased.

For example, the compressor 21 is controlled by using information of a temperature sensor or the like provided in the second indoor heat exchanger 53 so that the temperature of the second indoor heat exchanger 53 becomes the target value.

The opening degree of the second expansion valve 27 can be decreased in response to the required waste electric power amount within the upper limit of the discharge pressure of the compressor 21. The target value of the discharge pressure sensor 37 is set in response to the required waste electric power amount.

The workload (the electric power consumption) of the compressor 21 increases due to an increase in compression work, an increase in required flow rate of the refrigerant with an increase in outlet enthalpy of the outdoor heat exchanger 24, and an increase in rotation speed with a decrease in volume efficiency. At this time, since the temperature of the first indoor heat exchanger 55 increases, for example, the opening degree of the first air guide member 54 is made smaller in order to set the temperature (heat radiation quantity) of air blown out from the air outlet 57a as a target value. The increased electric power work is mainly discharged as thermal energy from the outdoor heat exchanger 24. Furthermore, in the case of the dehumidifying cooling operation, the opening degree of the first air guide member 54 is larger than that of the cooling operation and becomes an intermediate opening degree between a full closed state and a full open state (not shown).

Further, an example of increasing the electric power consumption of the vehicle air conditioner 10 by switching a switching member 59 of the vehicle air conditioner 10 to introduce air outside the vehicle compartment will be described with reference to FIG. 29 as the twelfth waste electric power control.

(Twelfth Waste Electric Power Control)

Figure 29:
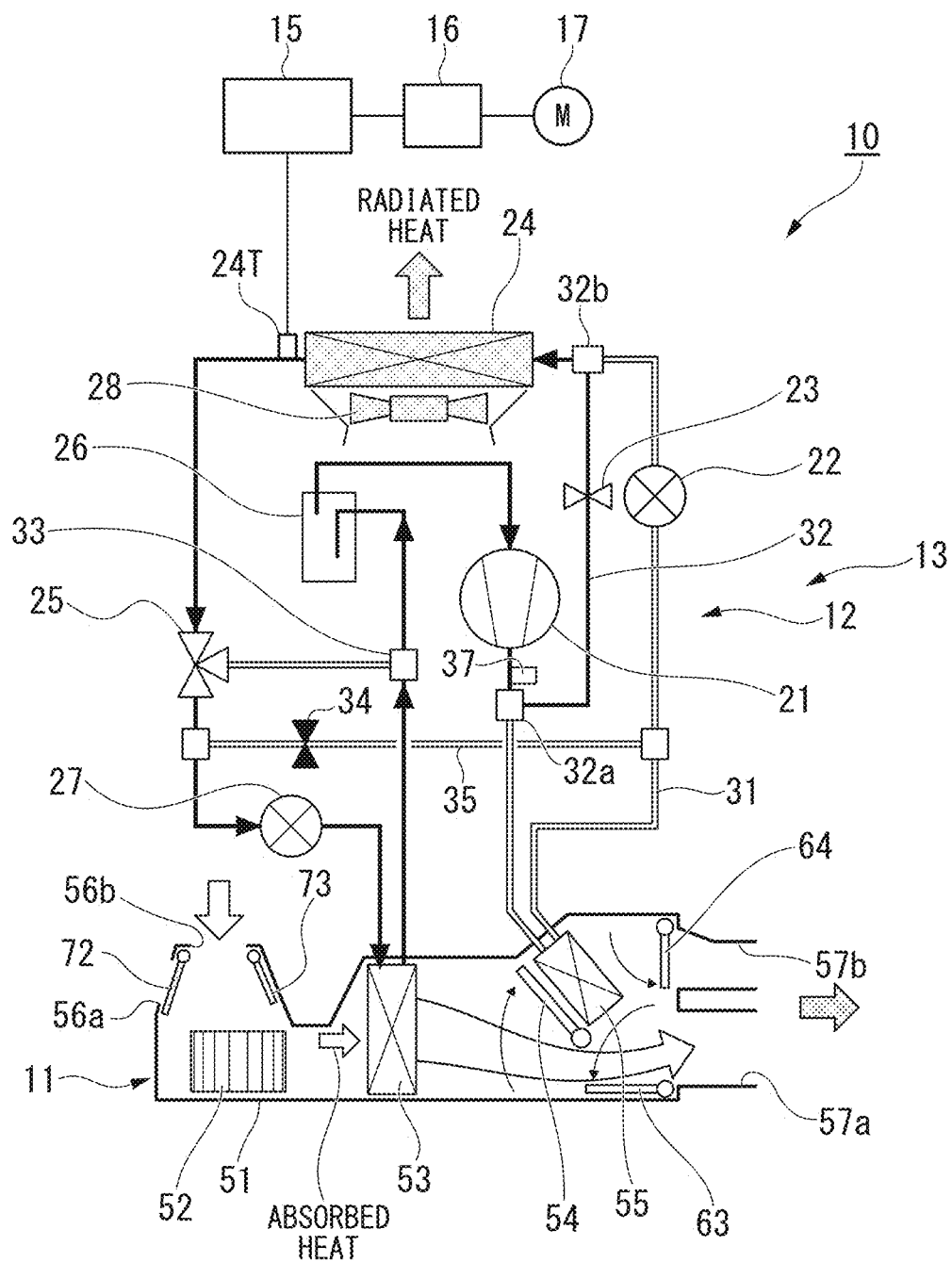
FIG. 29 is a configuration diagram illustrating twelfth waste electric power control of the electric vehicle according to the embodiment of the present invention.

As shown in FIG. 29, when the remaining capacity of the power storage device 16 is equal to or larger than a predetermined value, the control device 15 switches the switching member 59 so as to introduce air outside the vehicle compartment.

For example, the internal air inlet 56a is closed by the internal air door 72 of the switching member 59 and the external air inlet 56b is opened by the external air door 73. Thus, high-temperature air outside the vehicle compartment (that is, the external air) 75 can be introduced from the external air inlet 56b into the duct 51. When the high-temperature external air 75 is introduced into the duct 51, the operation efficiency of the vehicle air conditioner 10 can be decreased.

In this state, it is possible to increase the electric power consumption by increasing the cooling work of the vehicle air conditioner 10 in order to obtain the cooling capacity before the waste electric power control.

Accordingly, in the twelfth waste electric power control, when the electric power consumption of the compressor 21 is larger than the electric power generated by the electric motor 17, the overcharging of the power storage device 16 can be prevented. Further, when the electric power consumption of the compressor 21 is smaller than the electric power generated by the electric motor 17, an increase speed of the remaining capacity of the power storage device 16 can be decreased.

Furthermore, the twelfth waste electric power control may be not only the cooling operation but also the dehumidifying cooling operation. In the case of the dehumidifying cooling operation, the opening degree of the first air guide member 54 is larger than that of the cooling operation and becomes an intermediate opening degree between a full closed state and a full open state (not shown).

Next, an example of increasing the electric power consumption of the vehicle air conditioner 10 by decreasing the target temperature of the second indoor heat exchanger 53 of the vehicle air conditioner 10 and increasing the target temperature of the first indoor heat exchanger 55 will be described with reference to FIG. 30 as the thirteenth waste electric power control.

(Thirteenth Waste Electric Power Control)

Figure 30:
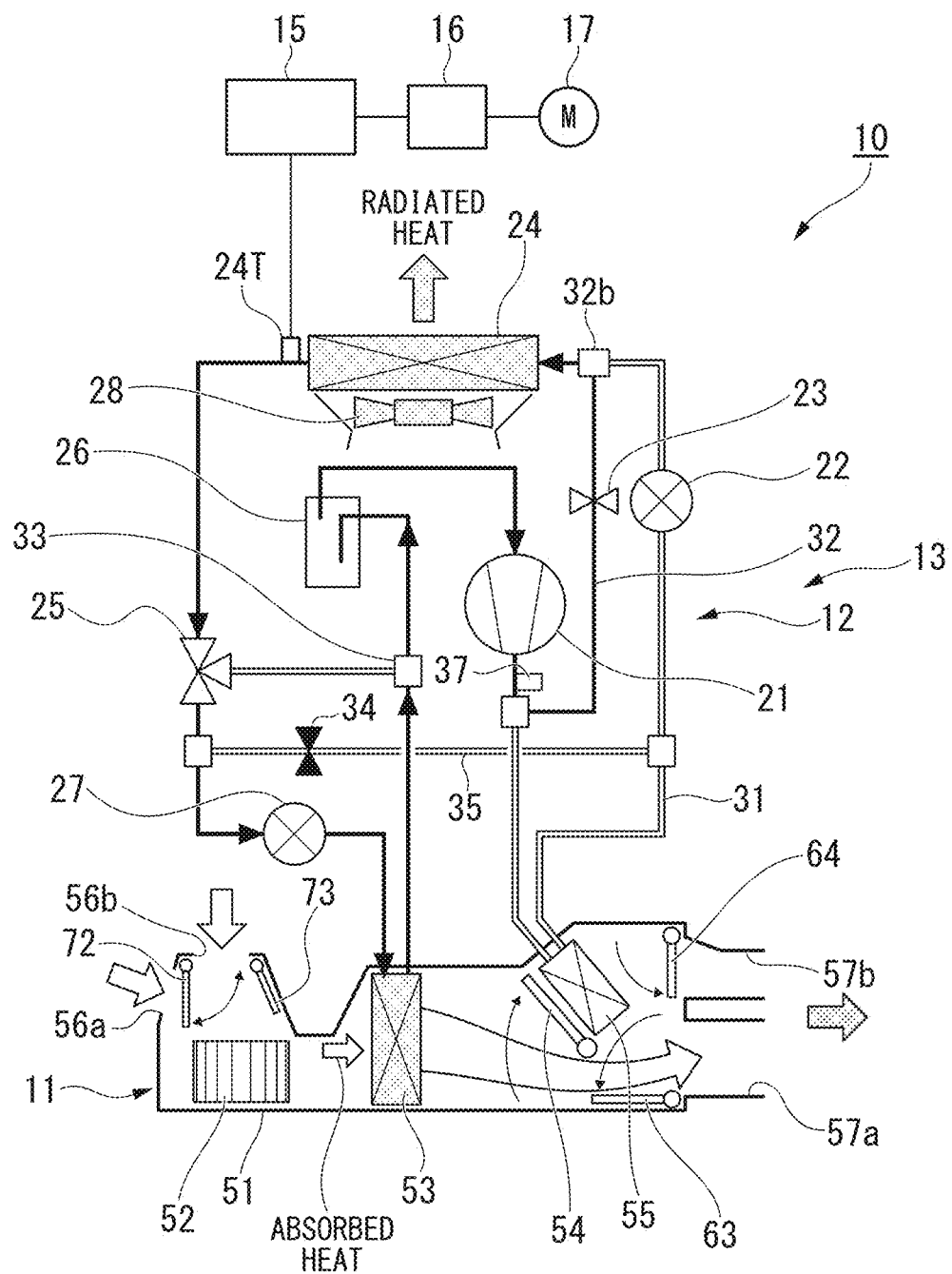
FIG. 30 is a configuration diagram illustrating thirteenth waste electric power control of the electric vehicle according to the embodiment of the present invention.

As shown in FIG. 30, when the remaining capacity of the power storage device 16 is equal to or larger than a predetermined value, the control device 15 sets the target temperature of the second indoor heat exchanger 53 to be lower than that of a case in which the remaining capacity of the power storage device is smaller than a predetermined value along with the operation of the compressor 21. At the same time, the control device 15 sets the target temperature of the first indoor heat exchanger 55 to be higher than that of a case in which the remaining capacity of the power storage device is smaller than a predetermined value.

In this way, it is possible to increase the cooling work of the vehicle air conditioner 10 by decreasing the target temperature of the second indoor heat exchanger 53. Further, it is possible to increase the heating work of the vehicle air conditioner 10 by increasing the target temperature of the first indoor heat exchanger 55. Accordingly, it is possible to increase the electric power consumption by decreasing the operation efficiency of the vehicle air conditioner 10.

Further, when the air temperature is decreased by the second indoor heat exchanger 53 and the low-temperature air is heated by the first indoor heat exchanger 55 again, it is possible to obtain the cooling capacity before the waste electric power control.

In a state in which the cooling capacity before the waste electric power control is obtained, the electric power consumption of the vehicle air conditioner 10 can be increased. Accordingly, in the thirteenth waste electric power control, when the electric power consumption of the compressor 21 is larger than the electric power generated by the electric motor 17, the overcharging of the power storage device 16 can be prevented. Further, when the electric power consumption of the compressor 21 is smaller than the electric power generated by the electric motor 17, an increase speed of the remaining capacity of the power storage device 16 can be decreased.

Furthermore, the thirteenth waste electric power control may be not only the cooling operation but also the dehumidifying cooling operation. In the case of the dehumidifying cooling operation, the opening degree of the first air guide member 54 is larger than that of the cooling operation and becomes an intermediate opening degree between a full closed state and a full open state (not shown).

Here, for example, when the heating amount of the first indoor heat exchanger 55 is too large, the first air guide member 54 is moved in a closing direction so that the cooling capacity before the waste electric power control can be obtained.

Meanwhile, when the cooling amount of the second indoor heat exchanger 53 is too large, the first air guide member 54 is moved in an opening direction so that the cooling capacity before the waste electric power control can be obtained.

Further, when a decrease in temperature of the second indoor heat exchanger 53 is adjusted, the electric power consumption increase amount can be adjusted. Furthermore, when a target temperature of blown air is equal to or smaller than a predetermined value at the time of performing the dehumidifying heating operation shown in FIG. 31 or the heating operation shown in FIG. 2, the dehumidifying cooling operation of the ninth to thirteenth waste electric power control can be selected. Since the predetermined value of the blown air is set for each of the external air temperature and the blower voltage, the accuracy is improved and hence the predetermined value can be set in the wider target blown air temperature range.

Next, the waste electric power control of the vehicle air conditioner 10 in the dehumidifying heating operation mode will be described. When the waste electric power control in the dehumidifying heating operation mode shown in FIG. 31 is performed, the cooling operation mode is selected and the ninth to thirteenth waste electric power control shown in FIGS. 25 to 30 and described in the cooling operation mode is performed.

Figure 31:
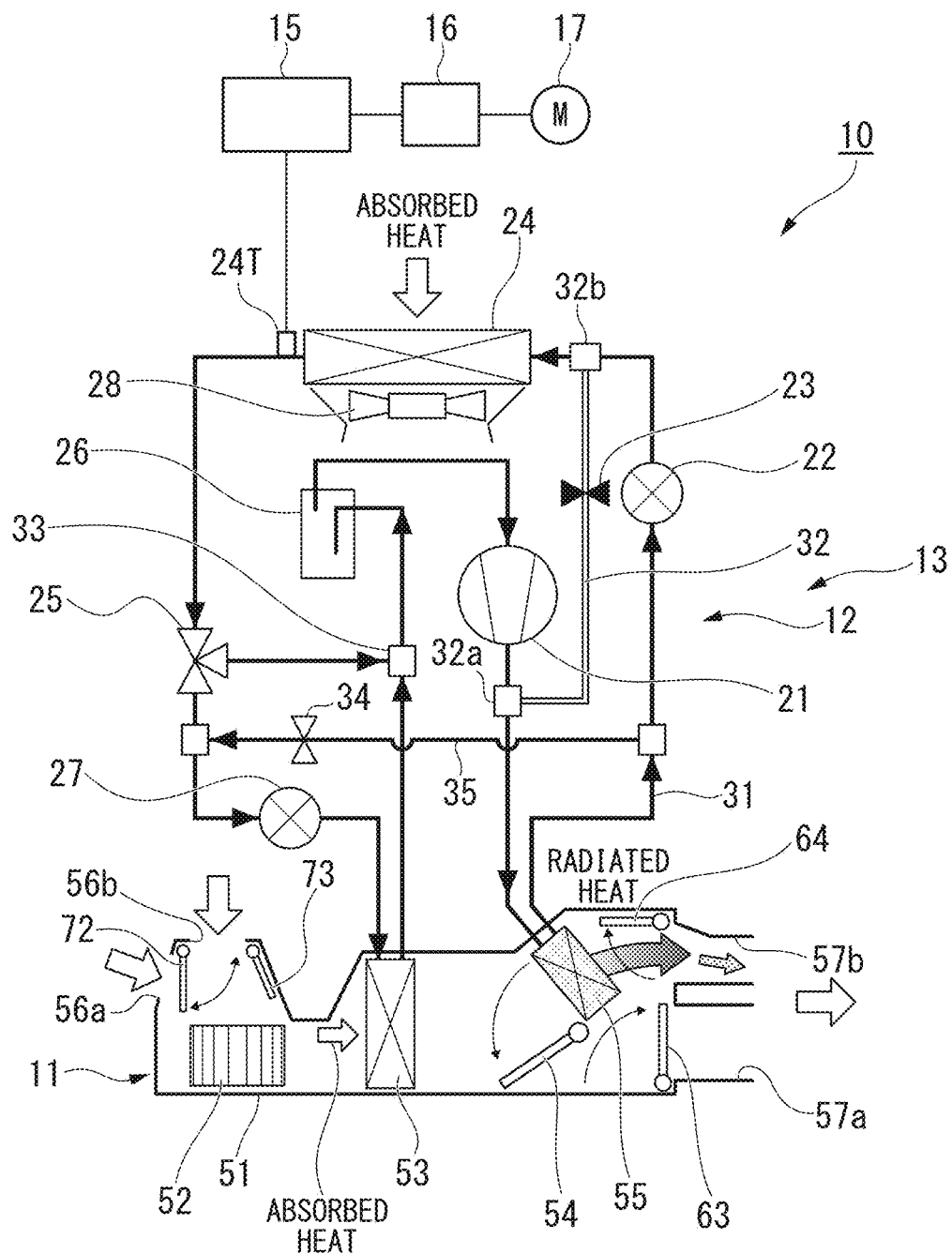
FIG. 31 is a configuration diagram illustrating a dehumidifying heating operation mode of the vehicle air conditioner according to the embodiment of the present invention.

As shown in FIG. 31, when the dehumidifying heating operation is performed by the vehicle air conditioner 10, the first air guide member 54 is set to the heating position in which the conditioned air passing through the second indoor heat exchanger 53 passes through a heating path and a dehumidifying electromagnetic valve 34 is set to an open state. Further, the first bypass valve 23 is set to a closed state.

In this case, in the heat pump cycle 12, the refrigerant discharged from the compressor 21 at a high temperature and a high pressure heats the conditioned air inside the duct 51 by radiating heat in the first indoor heat exchanger 55. In the refrigerant passing through the first indoor heat exchanger 55, one refrigerant flows toward the outdoor heat exchanger 24 and the other refrigerant flows into the dehumidifying passage 35.

Specifically, similarly to the heating operation, one refrigerant is expanded by the first expansion valve 22 and absorbs heat from the outdoor atmosphere in the outdoor heat exchanger 24.

Further, the other refrigerant is guided to the second expansion valve 27 through the dehumidifying passage 35, is expanded by the second expansion valve 27, and absorbs heat in the second indoor heat exchanger 53.

One refrigerant and the other refrigerant are merged at the merging portion 33 and flow into the gas-liquid separator 26 so that only the gas-phase refrigerant is sucked to the compressor 21.

Further, the conditioned air flowing in the duct 51 is cooled when passing through the second indoor heat exchanger 53. At this time, the conditioned air passing through the second indoor heat exchanger 53 is dehumidified while being cooled to a dew point or less. Subsequently, the dehumidified conditioned air passes through a heating path and is supplied into the vehicle compartment through the air outlet 57b for a dehumidifying heating purpose.

When the waste electric power control is performed during the dehumidifying heating operation of the vehicle air conditioner 10, the cooling operation mode is selected and the ninth to thirteenth waste electric power control described in the cooling operation mode and shown in FIGS. 25 to 30 is performed.

In this way, when the waste electric power control is performed in the cooling operation mode, the dehumidifying operation (the dehumidifying cooling operation and the dehumidifying cooling operation) mode, and the like, the cooling cycle efficiency due to the vehicle air conditioner 10 is decreased and the electric power consumption of the vehicle air conditioner 10 is increased. Accordingly, when the electric power consumption of the compressor 21 is larger than the electric power generated by the electric motor 17, the overcharging of the power storage device 16 can be prevented. Further, when the electric power consumption of the compressor 21 is smaller than the electric power generated by the electric motor 17, an increase speed of the remaining capacity of the power storage device 16 can be decreased.

Next, an example of performing a combination of the ninth to thirteenth waste electric power control in response to the electric power consumption increase amount (the waste electric power amount) necessary for preventing the overcharging of the power storage device 16 will be described with reference to FIG. 32 and Tables 1 and 2.

Figure 32:
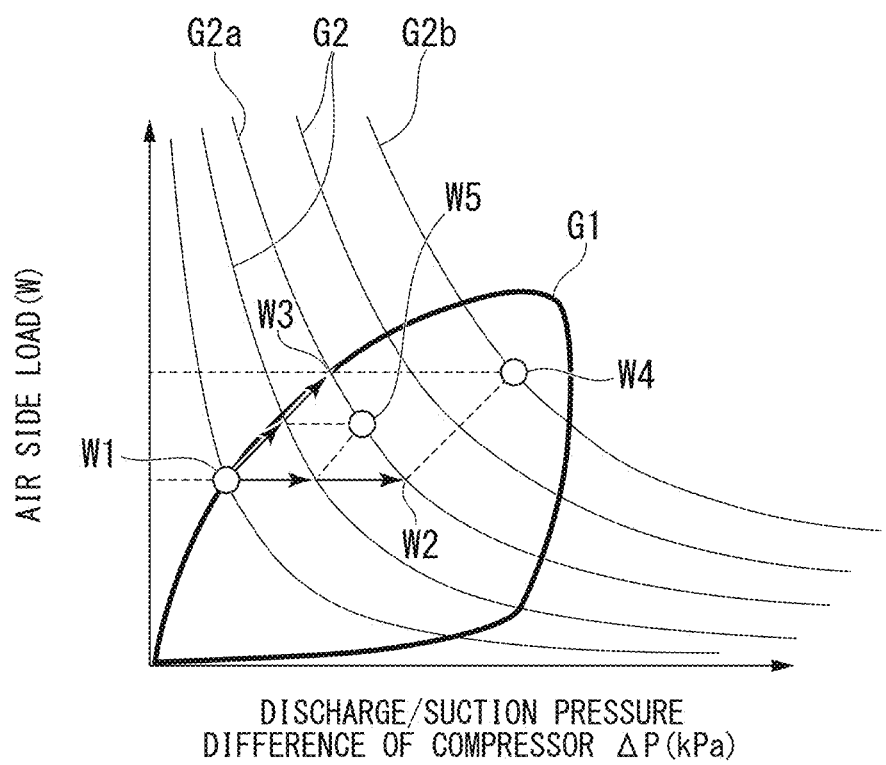
FIG. 32 is a graph showing a relationship of electric power consumption with respect to a suction/discharge pressure difference of a compressor and an air side load (air conditioning load) of the electric vehicle according to the embodiment of the present invention.

FIG. 32 shows a relationship of the electric power consumption with respect to the air side load (the air conditioning load) and the suction/discharge pressure difference of the compressor 21. In FIG. 32, a vertical axis indicates an air side load (W) and a horizontal axis indicates a suction/discharge pressure difference $\Delta P$ (kPa) of the compressor 21. Further, the cooling operation range is indicated by Graph G1 and the electric power consumption is indicated by the isoelectric power line G2.

In the isoelectric power line G2, an isoelectric power line G2a indicates a target electric power consumption (that is, a target waste electric power amount) and an isoelectric power line G2b indicates a maximum electric power consumption (that is, a maximum waste electric power amount).

It is possible to appropriately combine the ninth to thirteenth waste electric power control in response to the electric power increase amount (the waste electric power amount) required for preventing the overcharging of the power storage device 16 by recognizing the characteristic of the line diagram of FIG. 32. When combining the ninth to thirteenth waste electric power control, it is desirable to consider the control performance of the waste electric power amount in the ninth to thirteenth waste electric power control.

Here, when the electric power consumption shown in the line diagram of FIG. 32 is set for each of the evaporation temperature of the second indoor heat exchanger 53, the discharge pressure of the compressor 21, and the suction pressure of the compressor 21, it is possible to further improve the accuracy when combining the ninth to thirteenth waste electric power control.

When there is a plurality of combinations of the ninth to thirteenth waste electric power control, it is desirable to determine and select the priority rank of the waste electric power control on the basis of the limitation conditions such as the first to fifth conditions.

A first condition indicates the waste electric power control which prioritizes the responsiveness when increasing the electric power consumption.

A second condition indicates the waste electric power control which prioritizes the durability.

A third condition indicates the waste electric power control which prioritizes an influence on noise/vibration (NV).

A fourth condition indicates the waste electric power control which prioritizes an AC temperature change.

A fifth condition indicates the waste electric power control which prioritizes AC discomfort.

The "AC temperature change" indicates a change in breath temperature and a continuous change. The "AC discomfort" means odor derived from the vehicle air conditioner 10, a difference in discharge air temperature between the outlets, a change in air volume, and the like other than a change in temperature.

For example, the priority determination and the rank of the first to fifth conditions are set as follows.

That is, the priority rank of the first to fifth conditions is determined by which priority condition is satisfied at each time. In particular, when a condition to be prioritized is not satisfied or when a plurality of conditions to be prioritized are satisfied, it is judged according to the priority rank of "A to E" set in Table 1 in advance.

The "prioritized condition" is shown in Table 1.

power storage device 16, the waste electric power control of the third condition is selected in consideration of the "prioritized condition" of Table 1.

Further, when it is desired to suppress an influence of a change in temperature of the cooling and dehumidifying operations by the vehicle air conditioner 10 at the time of preventing the overcharging of the power storage device 16, the waste electric power control of the fourth condition is selected in consideration of the "prioritized condition" of Table 1. Furthermore, when it is desired to suppress an influence of the discomfort of the cooling and dehumidifying operations by the vehicle air conditioner 10 at the time of preventing the overcharging of the power storage device 16, the waste electric power control of the fifth condition is selected in consideration of the "prioritized condition" of Table 1.

Here, the selection of the ninth to thirteenth waste electric power control also includes a combination of the waste electric power control and the waste electric power control is desirably selected to match a necessary waste electric power amount in response to the electric power consumption characteristic for the air side load (the air conditioning load) and the suction/discharge pressure difference of the compressor 21 shown in the line diagram of FIG. 32.

For example, it is possible to increase the electric power consumption W2 after the waste electric power control from the electric power consumption W1 before the waste electric power control to the target waste electric power amount by performing the ninth to eleventh waste electric power con-

TABLE 1

| Request and limitation condition | Required condition | Priority rank |
|---|---|---|
| First condition (responsiveness) | When it is required to adjust waste electric power amount and to start and stop waste electric power of predetermined responsiveness or more in accordance with traveling state, SOC level, vehicle speed, gradient, brake stepping force, and handle steering angle are determined | A |
| Second condition (durability influence) | Case in which prevention of function loss due to failure at predetermined traveling distance/use time or less is prioritized even when performance is ensured by waste electric power due to total operation time or total workload of compressor exceeding predetermined value in accordance with heavy use | B |
| Third condition (NV influence) | Case in which battery SOC is lowered by waste electric power in preparation of downhill when vehicle speed is slow or vehicle is stopped | C |
| Fourth condition (ac temperature change) | Case in which difference between indoor temperature and target indoor temperature is large and gap with respect to target blow air temperature needs to be minimized or case in which difference between indoor temperature and target indoor temperature is small and change in blown air temperature is noticeable | D |
| Fifth condition (ac discomfort) | Case in which external air humidity is high and change in odor or humidity of blown air in accordance with dehumidification is large or case in which outlet is provided at two or more positions and difference of blown air temperature due to dehumidification changes | E |

That is, when it is desired to promptly cope with an increase in electric power consumption at the time of suppressing the overcharging of the power storage device 16, the waste electric power control of the first condition is selected in consideration of the "prioritized condition" of Table 1. Further, when it is desired to suppress an influence on the durability of the vehicle air conditioner 10 at the time of preventing the overcharging of the power storage device 16, the waste electric power control of the second condition is selected in consideration of the "prioritized condition" of Table 1. Furthermore, when it is desired to suppress an influence on the noise/vibration (hereinafter, referred to as NV) of the vehicle air conditioner 10 (that is, the electric vehicle Ve) at the time of preventing the overcharging of the trol among the ninth to thirteenth waste electric power control. Further, it is possible to increase the electric power consumption W3 after the waste electric power control from the electric power consumption W1 before the waste electric power control to the target waste electric power amount by performing the twelfth and thirteenth waste electric power control.

Furthermore, it is possible to increase the electric power consumption W4 after the waste electric power control from the electric power consumption W1 before the waste electric power control to the maximum waste electric power amount by performing the ninth to thirteenth waste electric power control.

Further, it is possible to increase the electric power consumption W5 after the waste electric power control from the electric power consumption W1 before the waste electric power control to the target waste electric power amount by performing the waste electric power control selected from the ninth to thirteenth waste electric power control and performing the waste electric power control selected from the twelfth and thirteenth waste electric power control.

Next, an example of selecting a preferable waste electric power control from the ninth to thirteenth waste electric power control so as to satisfy each condition of the first condition to the fifth condition will be described with reference to Table 2. As the performance level selecting the waste electric power control, "Aa" to "Ae", "Ba" to "Be", "Ca" to "Ce", "Da" to "De", and "Ea" to "Ee" are shown in Table 2.

The order of the good order of "Aa" to "Ae", "Ba" to "Be", "Ca" to "Ce", "Da" to "De", and "Ea" to "Ee" shown in Table 2 changes in accordance with the specification of the vehicle. For example, when the first condition is performed, the waste electric power control is performed from the control having the smallest electric power consumption in the first condition.

As an example, when the electric power consumption amount has a relationship of Aa<Ab<Ac<Ad<Ae, the waste electric power control is sequentially performed from "Aa" having a small electric power consumption amount.

Here, the waste electric power control which can be performed is different in accordance with the state of the vehicle. For example, there is a case in which the waste electric power control of "Ac" and "Ae" cannot be performed even when the electric power consumption amount satisfies a relationship of Aa<Ab<Ac<Ad<Ae at the time of performing the waste electric power control in the first condition. In this case, the waste electric power control having a small electric power consumption amount among "Aa", "Ab", and "Ad" is sequentially selected and performed.

Hereinafter, a priority rank of selecting a preferable waste electric power control from the ninth to thirteenth waste electric power control so as to satisfy each condition of the first condition to the fifth condition will be described with reference to Table 2.

For example, when it is desired to ensure the electric power consumption having most excellent responsiveness in a case in which the electric power consumption amount of the performance level of the first condition satisfies a relationship of Aa<Ab<Ac<Ad<Ae and the waste electric power control of "Aa" to "Ae" can be performed, the ninth waste electric power control with the number of "Aa" is selected. When it is desired to ensure an excellent electric power consumption after the ninth waste electric power control, the tenth waste electric power control with the number of "Ab" is selected. When it is desired to ensure an excellent electric power consumption after the tenth waste electric power control, the eleventh waste electric power control with the number of "Ac" is selected. When it is desired to ensure an excellent electric power consumption after the eleventh waste electric power control, the twelfth waste electric power control with the number of "Ad" is selected. When it is desired to ensure an excellent electric power consumption after the twelfth waste electric power control, the thirteenth waste electric power control with the number of "Ae" is selected.

Next, an example of performing the waste electric power control in consideration of the second condition will be described. For example, when it is desired to minimize the durability in a case in which the electric power consumption amount of the performance level of the second condition satisfies a relationship of Ba<Bb<Bc<Bd<Be and the waste electric power control of "Ba" to "Be" can be performed, the ninth waste electric power control with the number of "Ba" is selected. When it is desired to reduce an influence on the durability after the ninth waste electric power control, the tenth waste electric power control with the number of "Bb" is selected. When it is desired to reduce an influence on the durability after the tenth waste electric power control, the eleventh waste electric power control with the number of "Bc" is selected. When it is desired to reduce an influence on the durability after the eleventh waste electric power control, the twelfth waste electric power control with the number of "Bd" is selected. When it is desired to reduce an influence on the durability after the twelfth waste electric power control, the thirteenth waste electric power control with the number of "Be" is selected.

TABLE 2

| Request and limitation condition | | Ninth waste electric power control | Tenth waste electric power control | Eleventh waste electric power control | Twelfth waste electric power control | Thirteenth waste electric power control |
|---|---|---|---|---|---|---|
| First condition (responsiveness) | Good = fast | Aa | Ab | Ac | Ad | Ae |
| Second condition (durability influence) | Good = little influence | Ba | Bb | Bc | Bd | Be |
| Third condition (NV influence) | Good = little influence | Ca | Cb | Cc | Cd | Ce |
| Fourth condition (ac temperature change) | Good = little change | Da | Db | Dc | Dd | De |
| Fifth condition (ac discomfort) | Good = little discomfort | Ea | Eb | Ec | Ed | Ee |

First, an example of performing the waste electric power control in consideration of the first condition will be described with reference to Table 2.

Next, an example of performing the waste electric power control in consideration of the third condition will be described. For example, when it is desired to minimize an influence on NV in a case in which the electric power consumption amount of the performance level of the third condition satisfies a relationship of Ca<Cb<Cc<Cd<Ce and the waste electric power control of "Ca" to "Ce" can be performed, the ninth waste electric power control with the number of "Ca" is selected. When it is desired to reduce an influence on NV after the ninth waste electric power control, the tenth waste electric power control with the number of "Cb" is selected. When it is desired to reduce an influence on NV after the tenth waste electric power control, the eleventh waste electric power control with the number of "Cc" is selected. When it is desired to reduce an influence on NV after the eleventh waste electric power control, the twelfth waste electric power control with the number of "Cd" is selected. When it is desired to reduce an influence on NV after the twelfth waste electric power control, the thirteenth waste electric power control with the number of "Ce" is selected.

Next, an example of performing the waste electric power control in consideration of the fourth condition will be described. For example, when it is desired to minimize a temperature change in a case in which the electric power consumption amount of the performance level of the fourth condition satisfies a relationship of Da<Db<Dc<Dd<De and the waste electric power control of "Da" to "De" can be performed, the ninth waste electric power control with the number of "Da" is selected. When it is desired to reduce a change in temperature after the ninth waste electric power control, the tenth waste electric power control with the number of "Db" is selected. When it is desired to reduce a change in temperature after the tenth waste electric power control, the eleventh waste electric power control with the number of "Dc" is selected. When it is desired to reduce a change in temperature after the eleventh waste electric power control, the twelfth waste electric power control with the number of "Dd" is selected. When it is desired to reduce a change in temperature after the twelfth waste electric power control, the thirteenth waste electric power control with the number of "De" is selected.

Next, an example of performing the waste electric power control in consideration of the fifth condition will be described. For example, when it is desired to minimize the discomfort in a case in which the electric power consumption amount of the performance level of the fifth condition satisfies a relationship of Ea<Eb<Ec<Ed<Ee and the waste electric power control of "Ea" to "Ee" can be performed, the ninth waste electric power control with the number of "Ea" is selected. When it is desired to reduce the discomfort after the ninth waste electric power control, the tenth waste electric power control with the number of "Eb" is selected. When it is desired to reduce the discomfort after the tenth waste electric power control, the eleventh waste electric power control with the number of "Ec" is selected.

When it is desired to reduce the discomfort after the eleventh waste electric power control, the twelfth waste electric power control with the number of "Ed" is selected. When it is desired to reduce the discomfort after the twelfth waste electric power control, the thirteenth waste electric power control with the number of "Ee" is selected.

In this way, when the ninth to thirteenth waste electric power control is selected in consideration of the first condition to the fifth condition shown in Table 2, it is possible to perform the waste electric power control satisfying each condition.

Furthermore, the technical scope of the present invention is not limited to the above-described embodiment and can be modified into various forms without departing from the spirit of the present invention.

For example, in the above-described embodiment, an electric vehicle has been exemplified as a battery electric vehicle, but the present invention is not limited thereto. The present invention may be applied to, for example, a hybrid vehicle and a fuel cell vehicle as other vehicles.

What is claimed is:

1. An electric vehicle including an electric motor, a power storage device electrically connected to the electric motor, and a control device controlling the electric motor and the power storage device, comprising:
   a refrigerant circuit which includes a compressor compressing and discharging a sucked refrigerant, an outdoor heat exchanger exchanging heat between the refrigerant and external air, a first indoor heat exchanger disposed between the compressor and the outdoor heat exchanger and exchanging heat between the refrigerant and internal air, a first expansion valve disposed between the first indoor heat exchanger and the outdoor heat exchanger and capable of decompressing the refrigerant, a second expansion valve disposed between the outdoor heat exchanger and the compressor and capable of decompressing the refrigerant, and a second indoor heat exchanger disposed between the second expansion valve and the compressor and exchanging heat between the refrigerant and the internal air,
   wherein, when a remaining capacity of the power storage device becomes equal to or larger than a predetermined value, the control device repeats an operation of performing the other of a first operation of decompressing the second expansion valve and a second operation of decompressing the first expansion valve after performing one thereof.

2. The electric vehicle according to claim 1, further comprising:
   a first bypass valve which is able to bypass the first expansion valve; and
   a second bypass valve which is able to bypass the second expansion valve,
   wherein, when the remaining capacity of the power storage device is equal to or larger than the predetermined value, the control device switches the second bypass valve so as not to bypass the second expansion valve during the first operation and switches the first bypass valve so as not to bypass the first expansion valve during the second operation.

3. The electric vehicle according to claim 1,
   wherein, when the remaining capacity of the power storage device is equal to or larger than the predetermined value, the control device increases a passing air volume of a first air guide member controlling a passing air volume of the first indoor heat exchanger along with the operation of the compressor.

4. The electric vehicle according to claim 1, wherein the control device performs an operation having a largest electric power consumption first among the first operation and the second operation.

5. The electric vehicle according to claim 1, wherein the control device switches the first operation and the second operation within a period in which an electric power consumption of each operation is a first state.

6. The electric vehicle according to claim 1,
   wherein the control device switches the first operation and the second operation when a temperature of the first indoor heat exchanger becomes a first predetermined temperature or a temperature of the second indoor heat exchanger becomes a second predetermined temperature lower than the first predetermined temperature.

7. The electric vehicle according to claim 1,
wherein the control device switches the first operation and the second operation when a user of the electric vehicle does not require an air conditioning operation.

8. The electric vehicle according to claim 7,
wherein the control device decreases a volume of air guided into a vehicle compartment when the user of the electric vehicle does not require an air conditioning operation.

9. The electric vehicle according to claim 1, wherein the control device does not switch the first operation. and the second operation when a user of the electric vehicle requires an air conditioning operation.

10. The electric vehicle according to claim 9,
wherein, if the user of the electric vehicle requires an air conditioning operation when the remaining capacity of the power storage device is equal to or larger than the predetermined value, the control device decreases air conditioning operation efficiency while satisfying a request of the user.

* * * * *